United States Patent [19]

Kaliski

[11] Patent Number: 5,346,546

[45] Date of Patent: Sep. 13, 1994

[54] AGGREGATE-TiO₂ PIGMENT PRODUCTS

[75] Inventor: Adam F. Kaliski, East Windsor, N.J.

[73] Assignee: Industrial Progress, Inc., East Windsor, N.J.

[21] Appl. No.: 856,367

[22] Filed: Mar. 23, 1992

Related U.S. Application Data

[63] Continuation-in-part of Ser. No. 765,929, Sep. 24, 1991, abandoned, which is a continuation-in-part of Ser. No. 733,987, Jul. 22, 1991, abandoned.

[51] Int. Cl.⁵ ............................................. C09C 1/36
[52] U.S. Cl. .................................. 106/436; 106/442; 106/444; 106/464
[58] Field of Search ............... 106/416, 492, 446, 464, 106/465, 436, 420, 444

[56] References Cited

U.S. PATENT DOCUMENTS

| | | | |
|---|---|---|---|
| 2,974,108 | 3/1961 | Alexander | 252/313 |
| 3,476,692 | 11/1969 | Hoffmann | 252/317 |
| 3,726,700 | 4/1973 | Wildt | 106/300 |
| 5,116,418 | 5/1992 | Kaliski | 106/419 |

FOREIGN PATENT DOCUMENTS 2917313  7/1980  Fed. Rep. of Germany .

Primary Examiner—Karl Group
Assistant Examiner—Chris Gallo
Attorney, Agent, or Firm—Sachs & Sachs

[57] ABSTRACT

Aggregate-TiO₂ pigment products comprising in each 100 parts, by weight, at least 50 parts, by weight, particulate TiO₂ materials bound intrinsically with other pigmentary, subpigmentary and nonpigmentary components with the aid of inorganic and/or organic cements/adhesives.

13 Claims, No Drawings

AGGREGATE-TIO$_2$ PIGMENT PRODUCTS

This application is a continuation-in-part of co-pending patent application Ser. No. 07/765,929 ("Aggregate-TiO$_2$ Pigment Products") filed Sep. 24 1991, now abandoned which was a continuation-in-part of patent application Ser. No. 07/733,987, ("Aggregate-TiO$_2$ Pigment Products"), filed Jul. 22, 1991, now abandoned.

BACKGROUND OF THE INVENTION

1. Field of the Invention

This invention relates to novel aggregate-TiO$_2$ pigment products comprising in each 100 parts, by weight, at least 50 parts, by weight, particulate titanium dioxide, used alone or in a combination with other pigmentary and subpigmentary raw materials, bound intrinsically with the aid of inorganic and/or organic cements/adhesives.

In a preferred embodiment, this invention relates to aggregate pigment products in which particles of titanium dioxide and other pigmentary, subpigmentary and nonpigmentary components are coflocculated and cemented with the aid of in-situ synthesized calcium-silico-aluminate or similar complex (multicomponent) functional microgels.

2. Discussion of the Relevant Art

White pigments encompass a class of particulate materials which are essentially colorless, insoluble, nontoxic, reasonably nonabrasive, and have dimensions favoring a diffuse reflection, or scattering, of light constituting the visible portion of the electromagnetic spectrum with wavelengths ranging from 420 nm for violet to 660 nm for red.

In accordance with the laws of physical optics, maximum scattering of light occurs when a propagating light wave encounters in its path an obstacle, a pigment particle as the case in point, whose dimensions are equal to one-half of the length of the impinging wave. At equal particle dimensions, pigmentary materials with higher refractive indexes, whose values range from 1.41 for silica to 2.73 for rutile, scatter the light more efficiently than those with lower ones.

The most elementary physical model of light scattering may be considered one in which monochromatic light is diffracted by a single spherical particle. Maximum diffraction of the blue, green and red portions of the light spectrum (additive primary components of light) is obtained with particle diameters of about 150 nm, 200 nm and 250 nm, respectively. By integrating the comprehensive spectral response for a single spherical particle scattering polychromatic light, mapped as a function of particle diameter, one can calculate that the maximum light scattering occurs when this diameter is equal to about 200 nm.

The above physical textbook model of light scattering by a single spherical particle has been promoted for a long time in publications and product bulletins by the most technologically advanced titanium dioxide (TiO$_2$) pigment manufacturers (e.g., Du Pont's Bulletin H-12565, 12/88, TI-PURE ® Titanium Dioxide for Plastics). Although correct from the standpoint of physical optics, the above model is useless, or even misleading, in application to real-life systems. It should be strongly emphasized that there are ultimately no spherical pigment particles in any TiO$_2$-containing end-use formations found in practice that scatter light according to the elementary textbook model discussed previously. Instead, the originally discrete spherical TiO$_2$ particles occur in the latter formations in the form of complex aggregates (flocs) whose specific shapes and individual contributions to the overall light-scattering efficacy of the integral end-use formations cannot be described with the aid of available mathematical tools and physical models. It is possible, of course, to prepare, with a great deal of effort, artificial miniature formations reasonably amenable to modeling and mathematical treatment in which each single spherical particle of TiO$_2$ remains discrete; however, the spatial concentrations of pigment particles in such formations would be too low to serve any practical purposes.

It should further be borne in mind that TiO$_2$ pigments constitute but a fraction of the total tonnage of pigments used in the paper, paint and plastic industries. A useful model of light scattering by pigments must, therefore, be applicable both to any arbitrary pigment shape (virtually all inorganic pigments, other than TiO$_2$, being nonspherical anyway) as well as integral end-use formations containing these pigments, such as paper-coating and paint films, filled paper or pigmented plastics.

Let us consider, for example, a single, highly anisometric particle of kaolin clay in the form of a hexagonal platelet. The light waves of different lengths impinging upon such multifaceted platelets are scattered with different intensities, depending upon how closely the dimensions of a particular facet of this platelet approximate one-half of the length of the impinging light wave. Among the multitude of geometrical facets by which the impinging light wave may be scattered are, for example, platelet faces (in the x,y plane) or edges and protrusions from platelet surfaces (in z direction). Moreover, the impinging light waves are scattered independently by each of the six triangular tips of a hexagonal platelet, the shorter waves being scattered more efficiently closer to the tips, across shorter distances, while the longer waves are being scattered more efficiently farther from the tips, across longer distances. Since the ability to scatter light is a universal property of both particulate and extensive matter, even an "infinitely" large, most precisely polished mirror also scatters light, though only to a very negligible extent. In general, all light waves, regardless of lengths, scatter with different intensities across all physical obstacles encountered in their path, such as individual particles or parts of aggregated matter, grain boundaries or sites of localized stress concentrations giving rise to elasto-optical effects.

It should be emphasized, in the above context, that the term "pigments" (specifically, white pigments) denotes a pragmatic class of particulate materials, useful in the trade, whose features are defined by a convention. In the very minimum, pigments must consist to a predominant extent of particles whose dimensions uniquely favor the scattering of light, not so much with regard to the performance of individual particles but primarily with regard to that of the resultant end-use formations containing these particles. The latter requirement necessitates that pigments additionally possess certain specific features and performance properties, whose scope is not fixed, however, but expands in keeping pace with the scientific and technological advancements in the field of pigments.

Whether a solid particle can be classified as pigmentary depends not only on raw physical dimensions but also on the particle's morphology. Hence, monolithic, spherical, virtually perfectly isometric, single-faceted particles of $TiO_2$, or organic pigments, cease to be pigmentary for all practical purposes when their particle diameters exceed about 1 μm. On the other hand, multifaceted pigment particles, such as inherently aggregated clusters of elementary, ultrafine (subpigmentary) particles of precipitated silica or metal silicates can be as large as 10 μm or even 20 μm e.s.d. (equivalent spherical diameter) and still be pigment worthy. Regardless of their morphological features, however, all discrete particulate materials with dimensions finer than 0.1 μm e.s.d. are not pigment worthy, being classified as "subpigmentary." It should be pointed out, though, that inherently fine-particle-size pigment products, such as $TiO_2$ or high-glossing kaolin clay, usually contain substantial proportions of subpigmentary particles.

Typical commercial $TiO_2$ pigment products consist of spherical particles that are essentially 100% finer than 1.5 μm; 98–99% finer than 1 μm; and 35%–50% finer than 0.3 μm in diameter. Conspicuously, particles with a diameter of 0.2 μm, claimed in the literature to be the most favorable for light scattering, constitute but a minor proportion of the total mass of commercial $TiO_2$ pigment products. One may raise a logical question, therefore, as to why after so many decades of industrial use there are still no $TiO_2$ pigment products on the market having essentially all particles of about 0.2 μm in diameter. The above question becomes particularly intriguing in view of the fact that monodisperse fractions of the above type can be obtained with relative ease, as demonstrated repeatedly in laboratory comminution work carried out by the applicant.

The answer to the above question will become clear from the considerations to follow. First of all, a spherical shape for mineral pigment particles is disadvantageous in many respects. Spheres, which are perfectly isometric, single-faceted geometric bodies, scatter the light more selectively, hence, less efficiently, than analogous anisometric particles of an equivalent mass. Furthermore, spheres have an inherent tendency to form dense, closely packed formations (ensembles) with a low void volume, characterized by a low light-scattering efficacy. A closely packed ensemble of a monodisperse population of spheres has a maximum void volume of only about 26%, which can fall below 15%, or even 10%, for analogous polydisperse populations of spheres. The formation of closely packed ensembles of pigment particles, particularly spherical ones, is unavoidable in paper coating and filling, or in paints, causing many potential light-scattering sites to become inaccessible to the impinging light waves. Hence, the integral light scattering of a formation of closely packed spherical particles is invariably much lower than the sum of potential light-scattering effects attainable with the individual component particles scattering light as discrete, optimally separated spheres.

Indeed, decades of industrial experience have shown invariably that the light-scattering efficacy of pigmented formations containing high levels of $TiO_2$ particles (in a state of "overcrowding") is drastically reduced. As a con-sequence, the use of high proportions of $TiO_2$ in the overall pigmentation of commercial end-use systems is economically justified only in such special applications for which the opacifying action of low-refractive-index pigments of the prior art is simply too weak, e.g., manufacture of very thin bible paper, coating of kraft board, or formulation of high quality paints and lacquers.

Contrary to predictions of the physical textbook model of light scattering by a single spherical particle, the optical performance of an essentially monodisperse $TiO_2$ pigment with particles of about 0.2 μm in diameter, prepared from a commercial $TiO_2$ pigment product with the aid of a novel comminution process, was found to be significantly poorer than that of the starting coarser material. The substandard optical performance of the above monodisperse $TiO_2$ fraction is explained by excessive flocculation, leading to the formation of very dense, closely packed flocs with a strongly reduced light-scattering efficacy. It should also be borne in mind that $TiO_2$ pigments are used predominantly in a combination with low-refractive-index co-pigments, which are polydisperse systems with a wide spread of particle dimensions. While the above use of co-pigments is mostly beneficial, oversized particles present in co-pigments have a rather well-documented adverse effect upon the flocculation characteristics of the relatively very small $TiO_2$ particles.

The effect of larger particles on the flocculation tendency of smaller particles was first described by V.D. Samygin et al. in the article titled "Mechanism of Mutual Flocculation of Particles Differing in Size" (translated from *Kolloidnyi Zhurnal*, Vol. 30, No. 4, pp. 581–586, July–August, 1968), dealing with flocculation phenomena in flotation processes. According to the above article, the rate of adhesion of fine particles to coarser ones may be higher by a factor of $10^3$–$10^4$ than the rate of cohesion between finer particles. Applicant's subsequent research work showed that the above phenomenon is universal and is encountered in both wet and dry disperse systems. For example, coarser and more abrasive particle aggregates were obtained through calcining (sintering) very-fine-particle-size clay feeds whose particles range from 0.1 μm to 2.0 μm e.s.d. than by calcining analogous feeds purged from essentially all particles larger than 1.5 μm e.s.d. by centrifugal fractionation.

While the refractive index and light-scattering efficacy of titanium dioxide, particularly futile, are highest among all white pigments, the optical-performance potential of $TiO_2$ pigments is only fractionally utilized in practical applications. For example, in experiments carried out by the applicant, the light-scattering coefficients of optimally spaced, specially dispersed commercial $TiO_2$ pigments, measured with the aid of ultrathin films (50–100 $mg/m^2$) deposited on optically flat black glass plates, were found to approach 3 $m^2/g$. The same pigments used in paper filling or other similar applications usually have a light-scattering coefficient of about 0.45–0.5 $m^2/g$.

It is the object of the present invention, therefore, to provide a fundamentally novel, if not revolutionary, approach to the manufacture of aggregate pigment products with an "expanded" pigment lattice, prepared from $TiO_2$ pigments of the prior art used in the state "as is" or additionally processed. The approach in question is considered "revolutionary" inasmuch as it is both diametrically opposite to, as well as explicitly counterindicated by, the practices and doctrines of the prior art, as shall be explained in more detail in the discussions to follow.

Interspacing of high-refractive-index pigment particles with low-refractive-index ones has been a standing practice in the art since the introduction of lithopone pigments in about 1875. The latter pigments are obtained by coprecipitating birefringent zinc sulfide (refractive indices 2,356 and 2,378), used in proportions of from 30–60%, by weight, with barium sulfate (refractive index 1.64). Lithopone is thus the prototype of all composite pigments in which particles of high-refractive-index pigments, such as zinc sulfide (ZnS) or $TiO_2$, are "extended" (interspaced) with pigment particles of significantly lower refractive indexes, such as barium sulfate or clay.

Indeed, as $TiO_2$ was introduced on the market in 1919, quickly becoming the dominant high-refractive-index white pigment, it became instantly clear that the most economic performance of the latter is obtained when used in blends with less expensive, low-refractive-index co-pigments, such as barium sulfate. It has also been recognized, however, that a great deal of detrimental selective fractionation and flocculation occurs in practical applications involving the use of such loose pigment blends. Hence, various composite pigment products have been developed in which the "primary" (high-refractive-index) $TiO_2$ pigment was first intimately blended with, and subsequently affixed to, "secondary" pigments (extenders) having substantially lower refractive indexes to attain a permanent immobilization of all particulate species relative to each other. The above two key processing elements, i.e., maximum homogenization of the particulate component species prior to their immobilization and a subsequent permanent cementing of the resultant heteroaggregates (to ensure their mechanical integrity), are indispensable, though not always sufficient, for a successful synthesis of all composite pigments.

The initial main approaches to the manufacture of $TiO_2$-containing composite pigments involved either a precipitation of $TiO_2$ in a slurry of a secondary (extraneous) pigment, or a simultaneous coprecipitation of both $TiO_2$ and the secondary pigment followed by dewatering, calcining and pulverization. The above composite pigments, whose manufacture was based in part on a simulation of the lithopone process, were called "coalesced" composite pigments. A thorough intrinsic cementation of particle aggregates of the extended-$TiO_2$ pigments synthesized in the above-mentioned manner, ensuring these aggregates' mechanical integrity, was obtained by sintering during calcining.

Fundamentally different, novel approaches to the manufacture of composite pigments of the extended-$TiO_2$ type, based on coflocculation of pigmentary components dispersed in aqueous media, were disclosed by Alessandroni in U.S. Pat. Nos. 2,176,875, 2,176,876 and 2,176,877. In one of these approaches, for example, the coflocculation process was carried out by adding an extraneous flocculant to an aqueous pigment slurry containing both the (primary) high-refractive-index $TiO_2$ and the (secondary) low-refractive-index extender. In another approach, the coflocculation of the primary and secondary pigments was attained when a separately prepared aqueous slurry of $TiO_2$, dispersed with one type of dispersant, was blended with a separately prepared extender slurry, dispersed with another type of dispersant, "antipathetic" to the former one. In both of the above approaches, the flocculated media were filtered, dried and pulverized without employing the calcining step.

Based on the present colloid-chemical experience it is virtually certain, however, that a high degree of detrimental separation and selective aggregation of different particulate species could not have been avoided with the aid of the slow and inefficient flocculation mechanisms employed by Alessandroni. Furthermore, Alessandroni's approaches are devoid of any conceivable adhesion mechanism capable of imparting adequate mechanical integrity to the resultant composite pigments.

U.S. Pat. No. 3,453,131 to Fadner discloses a method for making composite pigments, both white and colored, consisting of functional colloidal particles of ". . . carbon black, acetylene black, iron oxide, Mannox blue, azobisisobutyronitrile, zinc oxide, methyl zimate, sulfur, titanium dioxide, polystyrene, or antimony oxide or mixtures thereof" with diameters ranging from 0.01 $\mu m$ to 1.0 $\mu m$, attached, by means of a "coupling agent," to platy clay particles, ranging from 0.5 $\mu m$ to 3.0 $\mu m$ in diameter, used as a carrier medium. The above composite pigments were synthesized by adding 0.5% to 25%, by weight, of an aliphatic acid (coupling agent) into an aqueous slurry of pigmentary components and ". . . mixing the composite suspension for a sufficient time to form the composite colloidal particles."

The resultant "composite particle suspensions" were considered as the final products intended for use in various commercial formulations in which the individual component materials have traditionally been employed in a loose (non-aggregated) state. U.S. Pat. No. 3,453,131 to Fadner also teaches that, "Alternately, the composite particles can be separated from the aqueous medium, for instance, by freeze-drying or by spray-drying, and utilized subsequently in formulating aqueous, non-aqueous or non-liquid composition."

Similarly to Alessandroni, Fadnet does not provide any information with regard to the mechanical integrity of the resultant dried composite particles. An analysis of the functional aspects of Fadner's composite pigment systems, however, clearly points to the lack of any practically significant adhesion mechanism capable of providing such an integrity to the composite pigments in question.

Yet another approach to the synthesis of composite pigments of the extended-$TiO_2$ type, in which coarse delaminated or calcined clays were employed as the extenders, was disclosed in U.S. Pat. No. 3,726,700 to Wildt. The latter approach relies on forming in situ (in the composite pigment furnish) alumino-silicate or similar gels (of the type used routinely in the $TiO_2$-pigment industry for applying surface coatings to $TiO_2$ particles) instead of on an intentional flocculation of pigment furnishes employed by Alessandroni and Fadnet. The mechanical integrity of Wildt's composite-pigment aggregates is provided by a thermal curing of the in-situ-formed gels, called in the above patent ". . . hydrous oxide of aluminum, silicon, titanium, and mixtures thereof."

In analyzing the colloidal and kinetic aspects of the approach used by Wildt, it is readily understood by those skilled in the art that a detrimental fractionation and selective flocculation of the pigmentary components employed, both according to species as well as size, could not have been prevented during the course of the lengthy synthesis process in which just a single step of digestion takes from 30 to 60 minutes. Furthermore, the above fractionation and selective flocculation were undoubtedly facilitated even more through the use of the dispersion-destabilizing alum. Although a permanent immobilization of $TiO_2$ particles relative to the extender particles was undoubtedly achieved in Wildt's composite pigments, there also is virtually no doubt that the latter immobilization was realized through an attachment of "blobs" of badly flocculated TiO$_2$ particles to the coarse extender particles.

The two most fundamental objections to be raised with regard to Wildt's composite pigments are (a) using far too few extender particles (calculated to be present in the system according to the relative proportions of TiO$_2$ and coarse-particle-size extenders employed) to interspace effectively the available TiO$_2$ particles; and (b) a total mismatch between the dimensions of the excessively coarse "spacer" (extender) particles in relation to the very much smaller TiO$_2$ particles to be "interspaced." Furthermore, since Wildt does not provide any data pertaining to the light-scattering efficacy of his composite pigments, e.g., in a head-to-head comparison with the rutile pigment used as the raw material, it is virtually impossible to draw unambiguous conclusions as to the true source of the improvement of the hiding efficacy of paint systems formulated with the aid of the composite pigments in question. As is well known to those skilled in the art, however, the hiding efficacy of TiO$_2$-based paints can also be increased by blending into the latter loose (extraneous) particulate high-oil-absorption silicate materials of the same type as the gel synthesized in situ in Wildt's composite pigments.

The principal concept of a permanent interspacing of high-refractive-index pigment particles with low-refractive-index extender particles, to prevent a detrimental crowding of the former, has been at the foundation of the design and manufacture of all composite pigments of this type known in the prior art. The above doctrine of interspacing is formulated in most explicit terms in U.S. Pat. No. 3,726,700 to Wildt, who states in col. 1, lines 45-56: "The optimum spacing to give the greatest efficiency of light scattering per TiO$_2$ particle is generally considered to be one half the wave length of light, or 0.20-0.25 microns. However, in the interest of obtaining higher total opacity of the system, it may be necessary to sacrifice light-scattering efficiency by closer spacing than optimum by addition of more TiO$_2$. At a TiO$_2$ volume concentration of about 30% (approx. 40% by weight—conversion from volume to weight added by the applicant), further additions no longer increase the total opacity because of a rapid rate of decrease of opacity with increased crowding."

In analyzing the reasons for the apparent lack of success in attaining the goal of a statistically uniform interspacing of TiO$_2$ particles with extender particles attempted in the prior art, attention must be drawn to yet another key processing element indispensable to the successful manufacture of the composite pigments in question. This key processing element is, in addition to the already discussed homogenization and cementing, an instantaneous, for all practical purposes, coflocculation (immobilization) of any and all heterodisperse and polydisperse particulate raw materials used in synthesizing composite pigments. As is well known to those skilled in the art, however, a viable method for an instantaneous flocculation (immobilization) of disperse particulates, preventing their separation and selective aggregation, had not been known in the prior art before it was disclosed in U.S. Pat. No. 5,116,418, to Kaliski ("Process for Making Structural Aggregate Pigments," as well as in the co-pending patent application Ser. No. 07/775,025 ("Functional Complex Microgels with Rapid Formation Kinetics") filed Oct. 11, 1991, now abandoned; Ser. No. 07/811,603 ("TiO$_2$-Containing Composite Pigment Products") filed Dec. 23, 1991, now U.S. Pat. No. 5,312,484; and Ser. No. 07/811,623 ("Low-Refractive-Index Aggregate Pigment Products") filed Dec. 23, 1991, now U.S. Pat. No. 5,279,663; the above-mentioned patents as well as applications being incorporated herein by reference. Moreover, extender pigments, suitable for attaining a geometrically uniform interspacing of populations of TiO$_2$ particles typical of present commercial TiO$_2$ pigment products, would have to have particle diameters ranging from about 0.05 to 0.1 $\mu$m. It should be pointed out, though, that ultrafine (subpigmentary) particulate materials of the above type were never available on the market and, if synthesized, would be almost impossible to disperse, store and utilize in typical industrial practices of the prior art.

Novel approaches toward interspacing of TiO2-pigment particles with particles of specially treated commercial extender pigments, to synthesize aggregate composite pigment products of the extended-TiO$_2$ type, were disclosed in the previously mentioned co-pending patent application Ser. No. 07/811,603. New types of aggregate-TiO$_2$ pigment products (fundamentally different from the extended-TiO$_2$ composite pigment products of the prior art), in which arbitrary levels of TiO$_2$-pigment-lattice expansion are obtained using, among other things, in-situ-synthesized subpigmentary particles, will be disclosed hereinafter.

The issue of an optimized extension of TiO$_2$ pigments, treated extensively in the literature in the past several decades, was most fittingly summarized by J.H. Brown in the article titled "Crowding and Spacing of Titanium Dioxide Pigments," issued in the *Journal of Coating Technology*, Vol. 60, No. 758, Pages 67-71, March 1988, dealing with hiding properties of nonporous paints. In the above article Brown dismisses the usefulness of particulate extenders, opting instead for coatings deposited on the surface of TiO$_2$ particles. His general conclusions are as follows: "For geometric reasons, the maximum size extender particles intended to improve hiding is limited by rutile size and volume concentration. Maximum size of hiding effective extender is small, less than commercial products and dispersion processes can deliver. Hiding improvements can, however, be obtained through uniform spacing of futile by coatings on rutile particles. The following requirements should be met: (1) Composition—"Extender"/rutile combinations should be less than 40 vol % extender/60 vol % futile; (2) Configuration—Extender should be present as a coating of less than 0.05 $\mu$m thickness on rutile; and (3) Application—The concept is applicable to paints of pigment volume concentration greater than 20%. The hiding power advantage of such a product over conventional rutile could be as much as 10%."

The inescapable conclusion drawn from an historical assessment of the above subject matter is that the approaches taken in the prior art with regard to the improvement of the optical-performance efficacy of TiO$_2$ pigments were grossly misguided. First of all, the phenomena of interspacing (extension) of TiO$_2$ particles were, as a rule, treated in an unrealistically isolated manner, without giving due consideration to such important phenomena as flocculation and co-flocculation occurring in the complex systems encountered in practice on the one hand and the polydisperse aspects of commercial TiO$_2$ products on the other. Secondly, the potential beneficial effects of a correct interspacing and extension of TiO$_2$ were badly underestimated in the prior art, as demonstrated by the data disclosed in the previously mentioned co-pending patent application Ser. No. 07/811,603, and as further demonstrated hereinafter.

It is worth emphasizing that while all composite pigments are, de facto, aggregates, the aggregation as such, specifically, a controlled aggregation, has never been employed in the prior art as an independent vehicle for the improvement of the optical properties of composite pigments. All such improvements have always been attempted through an interspacing of particles of the primary (high-refractive-index) pigments with particles of secondary (low-refractive-index) pigments/extenders. The reason for this becomes clear considering that the most detrimental side effects encountered in practical applications of $TiO_2$ pigments, used alone or in blends with other pigments, are associated largely with undesirable flocculation phenomena, particularly those of a selective type.

The potential for improving the light-scattering properties of entire pigment populations by aggregating in situ pigment fines (subpigmentary fractions present to some extent in virtually all commercial pigment products), whose dimensions in a discrete state are too small for efficient light scattering, was first discovered by the applicant and published in the *Journal of the Technical Association of the Pulp and Paper Industry* (TAPPI), Vol. 53, No. 11, November 1970, Pages 2077–2084 ("Performance of Some Commercial Clays in Starch-Containing Paper-Coating Films; Part I. Black Glass Plates as Model Substrates"), preceded by a presentation at the TAPPI Coating Conference held in Houston, Texas, May 3–4, 1970. The above publication contains, among other things, a graphical presentation (FIGS. 6 and 7) of the light-scattering coefficients (at the wavelengths of 457 and 577 nm) of three different clay pigments made into starch-containing coating colors and deposited as films on optically flat black glass plates as coating substrates and assessed as a function of the binder-volume fraction in the coating. The slopes of the curves representing the light-scattering coefficients of No. 1 and No. 2 coating clays ascend initially with the increasing binder-volume fractions and, after reaching the maximum values at a binder-volume fraction corresponding to about 5 parts of starch per 100 parts of clay, by weight, descend as the binder level is further increased.

This initial increase of the light-scattering coefficients is explained in the above publication "... by an aggregation of clay fines effected by the initial addition of binder. The aggregates of ultrafine particles, which are understood here as assemblies of a very few such particles, should scatter the light more effectively than the individual components." The subsequent steady decline of the magnitude of the light-scattering coefficients is explained as follows: "An increase of the binder content of the coating systems beyond the $F_{bv}$ (binder-volume fraction—explanation added by the applicant) value of 0.080 (5 parts starch per 100 parts clay, by weight) appears to cause a further growth of the assemblies of pigment particles, so that the optimum dimensions of the light-scattering sites are exceeded."

With the relatively coarse mechanically delaminated clay, having only minor proportions of pigment fines (particles smaller than 0.1–0.2 μm e.s.d.), the light-scattering coefficients of the coatings declined from the very first incremental addition of the binder because of the scarcity of ultrafine particles amenable to a beneficial aggregation. The intrinsically coarser structure of the coating films containing the mechanically delaminated clay, compared to the structure of coatings containing No. 1 and No. 2 clays, was verified with the aid of a new empirical parameter called "Rho" (after the Greek letter ρ), defined in the above publication as the ratio of the numerical values of the light-scattering coefficients determined at 577 nm and 457 nm for the same coating film. With coating films characterized by intrinsically finer structures, such as binderless coatings or coatings with a low binder-volume fraction, the magnitudes of the corresponding "Rho" parameters are low. As the intrinsic coating structure becomes coarser, as was the case with all coatings discussed in the above publication in which the binder content was continuously increased, the magnitude of Rho increases accordingly. Below a certain specific binder-volume fraction (corresponding to about 5–8%, by weight), the coarsening of the coating structure is beneficial; hence, an increasing Rho value is associated with an increase of the light-scattering coefficients. Above this specific binder-volume fraction, however, the coarsening of the coating structure becomes excessive, the increasing Rho values being associated with a decrease of the light-scattering coeficients.

As is evident from the above considerations, further verified by ample practical experience, the light-scattering efficacy of both white pigments and end-use formations containing such pigments can be significantly improved by a purposeful in-situ aggregation of pigment fines. It is also obvious, from the standpoint of physical optics, that the beneficial in-situ aggregation of pigment fines applies universally to all white pigments, regardless of whether they are made of low- or high-refractive-index materials. The above-mentioned publication by Kaliski (*TAPPI Journal*, Vol. No. 11, November 1970, Pages 2077–2084) thus established the scientific foundations for an entirely new pigment technology opening the way to designing and manufacturing new lines of pigment products with an improved optical performance, such pigment products being synthesized by a controlled aggregation of commercial and/or novel pigmentary raw materials, used alone or combined with various subpigmentary and/or nonpigmentary particulates.

Indeed, the first patent pertaining to the manufacture of aggregate pigments with an improved optical performance (U.S. Pat. No. 4,075,030: High Bulking Clay Pigments and Methods for Making the Same) was issued in 1978 to Bundy et al., followed by related patents by other inventors. It should be emphasized, however, that none of the patented aggregate pigments was synthesized under conditions allowing a satisfactory control of the aggregation process, attainable only with the aid of an instantaneous, indiscriminate and complete flocculation. A flocculation process of the above-mentioned type was unknown in the prior art, however, before the previously-mentioned disclosure by the applicant. Moreover, as documented amply by industrial experience, the problem of imparting an adequate mechanical integrity to aggregate pigments, while simultaneously generating controlled (beneficial) intrinsic aggregate structures, has never been resolved satisfactorily in the technology of aggregate-pigment products of the prior art.

Novel methods for the manufacture of practically countless types of structural aggregate pigments with exotic compositions, enhanced optical properties, excellent mechanical integrity, and unique functional properties, based, among other things, on the beneficial in-situ aggregation of pigment fines, were disclosed in the previously mentioned U.S. Pat. No. 5,116,418 to Kaliski and U.S. Pat. Nos. 5,279,633 and 5,312,484.

In accordance with the foregoing and disclosures to follow, it is an object of the present invention to provide compositions for novel aggregate-TiO$_2$ pigment products consisting predominantly of TiO$_2$ as the raw material and synthesized by the general method disclosed in the above mentioned U.S. Pat. No. 5,116,418 to Kaliski, and by any other methods and approaches known in the prior art applicable, in principle, to synthesizing the aggregate-pigment products under discussion.

It is also an object of the invention to provide compositions for novel aggregate-TiO$_2$ pigment products comprising in each 100 parts, by weight, at least 50, preferably more than 77, parts, by weight, of intrinsically cemented particulate TiO$_2$ derived from prior-art TiO$_2$ pigment products in the state "as is," or comminuted further, beyond the limits of comminution practiced in the prior art, to particle dimensions essentially 100% finer, by weight, than from 0.3 $\mu$m to 0.9 $\mu$m in diameter; borderline pigmentary, with particles essentially 100% finer, by weight, than 0.2 $\mu$m in diameter; or even subpigmentary, with particles essentially 100% finer, by weight, than 0.1 $\mu$m in diameter.

It is a further object of the invention to provide compositions for novel aggregate-TiO$_2$ pigment products (consisting predominantly of TiO$_2$ as the raw material) made by a controlled in-situ aggregation of TiO$_2$ fines to render the latter more effective with regard to light scattering.

It is a yet further object of the invention to provide compositions for novel aggregate-TiO$_2$ pigment products in which the statistical pigment lattice formed by aggregated particles of TiO$_2$ is expanded at will with the aid of one or more of the following materials:

(a) in-situ (in the starting pigment furnish) synthesized inorganic, organic and/or (hybrid) inorganic/organic cements/adhesives;

(b) in-situ-synthesized mineral subpigmentary particulates;

(c) mineral subpigmentary particulates introduced into the system (pigment furnish) from an extraneous source; and (d) extraneous particulate and/or water-soluble nonpigmentary materials.

It is a still further object of the invention to provide compositions for novel aggregate-TiO$_2$ pigment products additionally containing minute proportions of color dyes to obtain color-neutral end products devoid of the inherent yellow hue of commercial TiO$_2$.

It is a yet further object of the invention to provide compositions for novel aggregate-TiO$_2$ pigment products additionally containing up to 5 parts, by weight, of color dyes to render the resultant products directly applicable to the coloring of paper, paints, plastics and synthetic fibers.

It is a yet further object of the invention to provide compositions for novel aggregate-TiO$_2$ pigment products additionally containing specially deagglomerated carbon black to impart extra-high opacifying properties to these products and thus render them particularly suitable for such applications as the manufacture of lightweight newsprint or paints and lacquers with ultra-high hiding properties.

A still further object of the invention is to provide compositions for novel aggregate-TiO$_2$ pigment products additionally containing minute proportions of chemically built-in organic, cationically active compounds with at least two reactive groups in each molecule to impart arbitrary levels of oleophilic properties to these products and thus render them uniquely compatible with, and dispersible in, organic media such as plastics, synthetic fibers and solvent-based lacquers and paints.

A yet further object of the invention is to provide compositions for novel aggregate-TiO$_2$ pigment products additionally containing extraneously prepared, low-refractive-index inorganic and/or organic pigments, used as diluents, to increase the economy of use of the resultant aggregate pigment products.

It is a further object of the invention to provide compositions for novel aggregate-TiO$_2$ pigment products in which the particulate ingredients are coflocculated in a controlled manner into pigmentary aggregates whose intrinsic structure and spatial distribution of light-scattering sites provide substantially better light-scattering efficacy, functional properties and economy of use than can be obtained with unadulterated (nonaggregated) TiO$_2$ pigment products of the prior art.

It is also a particularly special object of the invention to provide principles of qualitative and quantitative formulating of the component raw materials employed, as well as principles of designing optically favorable, intrinsic spatial and structural particulate configurations to arrive at novel aggregate-TiO$_2$ pigment products whose superior optical performance constitutes a proof that the theoretical models and doctrines accepted in the prior art, and actively supported by the most technologically advanced manufacturers of TiO$_2$ pigment products, are essentially inapplicable to the end-use systems encountered in commercial practice.

SUMMARY OF THE INVENTION

The present invention relates to novel aggregate-TiO$_2$ pigment products comprising in each 100 parts, by weight, at least 50, preferably more than 77, parts, by weight, particulate TiO$_2$, used alone or in a combination with other pigmentary and subpigmentary raw materials, and from 0.1 to 23 parts, by weight, cements/adhesives, and, optionally, at least one of the following additional materials:

(a) in-situ-synthesized subpigmentary mineral particulates, up to 25 parts, by weight;

(b) extraneous, mechanically deagglomerated/comminuted subpigmentary mineral particulates, up to 25 parts, by weight;

(c) inorganic, low-refractive-index pigmentary diluents, up to 45 parts, by weight;

(d) organic, low-refractive-index, non-film-forming pigmentary diluents, up to 10 parts, by weight;

(e) color dyes, up to 5 parts, by weight;

(f) carbon black, up to 0.25 parts, by weight; and (g) organic, cationically active chemical compounds with at least two reactive groups in each molecule, up to 0.5 parts, by weight;

wherein said particulate TiO$_2$ materials, alone or in blends with said additional materials, are made into intrinsically cemented pigmentary aggregates to obtain aggregate-TiO$_2$ pigment products with a substantially higher optical-performance efficacy and better functional performance than can be obtained with loose (unadulterated) TiO$_2$ pigment products or equivalent blends of loose TiO$_2$ pigment products with said additional materials.

Said cements/adhesives, used in practicing the present invention, are selected from the group consisting of the following materials:

(a) in-situ-synthesized inorganic microgel cements obtained by cross-linking of sodium-silico-aluminate and similar transient, chemically reactive subcolloidal hydrosols with bivalent and/or multivalent inorganic salts;

(b) in-situ-synthesized inorganic cements obtained by a hydrolysis of metal chlorides, with the aid of ammonia, in said $TiO_2$ and other pigmentary and/or subpigmentary, essentially dry, raw materials (having a moisture content of from 0.4 to 1%, by weight) intimately blended with in-situ-synthesized and/or mechanically deagglomerated/comminuted subpigmentary cement precursors;

(c) in-situ-synthesized polysalts obtained by a reaction between organic (monomeric or polymeric) dispersants and organic cationic polyelectrolytes;

(d) in-situ-synthesized, predominantly inorganic (hybrid, inorganic/organic) microgel cements obtained by cross-linking of sodium-silico-aluminate and similar transient, chemically reactive subcolloidal hydrosols with a blend of bivalent (and/or multivalent) inorganic salts and organic, cationically active chemical compounds with at least two reactive groups in each molecule;

(e) in-situ-synthesized complexes, which can be predominantly inorganic or predominantly organic, obtained by a reaction between organic, cationic polyelectrolytes and inorganic, anionic dispersants, such as alkali-metal phosphates or alkali-metal silicates; and (f) extraneous organic cements/adhesives selected from the group consisting of the following materials:

(1) thermoplastic adhesives in the form of ultrafine dispersions in liquids, preferably water, having particles essentially 100%, by weight, finer than 0.2 $\mu$m in diameter, preferably 100%, by weight, finer than 0.1 $\mu$m in diameter;

(2) organic cements curable by chemical processes;

(3) chemically nonreactive emulsion-polymer adhesives and chemically nonreactive water-soluble polymer adhesives;

(4) chemically reactive emulsion-polymer adhesives and chemically reactive water-soluble adhesives; and (5) water-disperse and water-soluble polymer adhesives curable by thermal or radiant energy.

Said in-situ-synthesized and/or extraneous cements/adhesives for the manufacture of said aggregate-$TiO_2$ pigment products of the present invention, comprising pigmentary and subpigmentary $TiO_2$ as the principal raw materials, are employed individually or in combination with other cements/adhesives using the following proportions in relation to each 100 parts, by weight, of said $TiO_2$ and other pigmentary and subpigmentary raw materials:

(a) up to 20 parts, by weight, in-situ-synthesized inorganic or predominantly inorganic (hybrid, inorganic/organic) complex microgel cements, regardless of whether employed as the only cements/adhesives in the system or in a combination with other organic, in-situ-synthesized and/or extraneous cements/adhesives;

(b) up to 20 parts, by weight, in-situ synthesized inorganic cements obtained by hydrolyzing metal chlorides, with the aid of ammonia, in the presence of subpigmentary (in-situ-synthesized and/or mechanically deagglomerated/comminuted) cement precursors intimately blended with said $TiO_2$ and other pigmentary and/or subpigmentary raw materials, regardless of whether employed as the only cements/adhesives in the system or in a combination with other organic, in-situ-synthesized and/or extraneous cements/adhesives;

(c) up to 10 parts, by weight, extraneous, organic cements/adhesives, active basis, when employed in addition to the following:

(1) in-situ-synthesized inorganic complex microgel cements;

(2) in-situ-synthesized inorganic cements obtained by hydrolyzing metal chlorides in the presence of cement precursors; and (3) in-situ-synthesized predominantly inorganic (hybrid, inorganic/organic) complex microgel cements;

(d) up to 10 parts, by weight, cements/adhesives, active basis, when employed as the only cements/adhesives in the system, selected from the group consisting of the following materials:

(1) in-situ-synthesized organic polysalts;

(2) in-situ-synthesized complexes, which can be predominantly inorganic or predominantly organic, obtained by a reaction between organic, cationic polyelectrolytes and inorganic, anionic dispersants;

(3) extraneous, organic cements curable by chemical processes;

(4) organic, chemically nonreactive emulsion-polymer and/or water-soluble polymer adhesives;

(5) organic, chemically reactive emulsion-polymer and/or water-soluble polymer adhesives; and (6) organic, water-disperse and/or water-soluble polymer adhesives curable by thermal or radiant energy;

(e) up to 15, parts, by weight, ultrafine dispersions of thermoplastic adhesives (with particles essentially 100%, by weight, finer than 0.1–0.2 $\mu$m), active basis, when used as the only cements/adhesives in the system.

The content of all cements/adhesives, employed in any arbitrary combination, should not exceed 23% of the mass of said aggregate-$TiO_2$ pigment products (equivalent to 30 parts, by weight, for each 100 parts, by weight, of $TiO_2$ and other pigmentary and/or subpigmentary raw materials).

DESCRIPTION OF THE PREFERRED EMBODIMENTS

In the preferred mode of practicing the present invention, novel aggregate-$TiO_2$ pigment products for paper, paint and plastic applications are manufactured from particulate $TiO_2$ of pigmentary and/or subpigmentary types.

The aggregate-$TiO_2$ pigment products under discussion comprise at least 50, preferably more than 77, parts, by weight, of at least one particulate $TiO_2$ material. The particulate $TiO_2$ materials can be of the commercially available pigmentary types, with particles essentially 100%, by weight, finer than 1.5 $\mu$m; 98%–99%, by weight, finer than 1 $\mu$m; and 35%–50%, by weight, finer than 0.3 $\mu$m, in diameter; or of the extra-fine types obtained by comminuting commercial $TiO_2$ pigments beyond the limits of comminution practiced in the prior art so as to obtain TiO$_2$ particle populations that are essentially 100%, by weight, finer than from 0.3 μm to 0.9 μm in diameter.

Yet other TiO$_2$ raw materials suitable for synthesizing the aggregate-pigment products of the present invention are of an ultrafine type, obtained by comminuting commercial TiO$_2$ pigments with the aid of tungsten-carbide balls with diameters ranging from about 10 μm to about 70+ μm. The latter ultrafine TiO$_2$ raw materials can be borderline-pigmentary, having an almost monodisperse particle population with an average diameter of about 0.2 μm, or subpigmentary, having essentially all particles finer than 0.1 μm in diameter.

As is well known to those skilled in the art, all highly disperse minerals, such as the above-mentioned TiO$_2$ particles with a diameter of 0.2 μm, or even 0.1 μm, are very difficult to handle in commercial manufacturing operations without avoiding a spontaneous, undesirable reaggregation. However, perfectly dispersed slurries of such ultrafine TiO$_2$ or other mineral particulates can be conveniently employed in the manufacture of aggregate-TiO$_2$ pigments of the present invention by conveying slurries of freshly comminuted ultrafine particles directly from the grinding vessels into the continuous reactors, such as are preferred for synthesizing the aggregate-TiO$_2$ pigment products under discussion.

Other essential raw materials for the synthesis of the above-mentioned aggregate--TiO$_2$ pigment products are inorganic and/or organic cements/adhesives intended for imparting adequate mechanical integrity to these products (thus enabling them to withstand the action of shearing forces encountered during the customary handling and end-use applications), as well as for other important functions, to be discussed hereinafter. The above cements/adhesives can be introduced into the system (furnish) from an extraneous source or be synthesized in situ in furnishes comprising disperse particulate TiO$_2$ and other pigmentary, subpigmentary and nonpigmentary components for making the aggregate-TiO$_2$ pigment products in question. It should also be pointed out that while all cements can be considered in general as a special class of adhesives, not all adhesives fit the category of cements. The designation cements/adhesives employed herein is thus intended to avoid confusing distinctions and to denote that both the cements as well as conventional adhesives are applicable to practicing the present invention.

Out of many potential technological approaches applicable to the manufacture of the aggregate-TiO$_2$ pigment products of the present invention, the most preferred one is based on an instantaneous, indiscriminate and complete coflocculation of particulate TiO$_2$ with other particulate and soluble auxiliary materials (dispersed and/or dissolved in the pigment furnish) with the aid of the in-situ-synthesized complex (multicomponent) functional microgel cements disclosed in the previously mentioned U.S. Pat. No. 5,116,418 to Kaliski and U.S. Pat. Nos. 5,279,633 and 5,312,484.

The inorganic and hybrid, predominantly inorganic complex microgels, further in the specification and in the claims to follow referred to by generic terms (regardless of chemical composition) as complex microgels or microgel cements, are formed in two distinct process stages, a different polymerization mechanism being active in each stage.

In the first process stage, two separate reagent solutions are introduced into the aqueous furnish comprising particulate TiO$_2$ and other auxiliary materials, which can be particulate and/or soluble, pigmentary and/or subpigmentary, and even nonpigmentary. One of the reagent solutions contains an alkali-metal, or quaternary ammonium silicate, preferably sodium silicate. The other solution contains an alkali-metal aluminate and/or alkali-metal zincate, preferably sodium aluminate. An immediately commencing addition polymerization of the above principal reagents leads to the formation of sodium-silico-aluminate (zincate) dimers, trimers and higher-rank oligomers. These transient, chemically reactive anionic polymer precursors remain, for a limited period, in a very specific state of solution, for which the objectively fitting term "subcolloidal hydrosols" is being employed herein.

In the second process stage, an aqueous solution of at least one cross-linking agent selected from the group consisting of essentially colorless, bivalent and/or multivalent salts of calcium, magnesium, barium, aluminum, zinc and zirconium, preferably calcium chloride or nitrate, is introduced into the above-mentioned furnish containing the subcolloidal hydrosol formed in the first process stage. The polycondensation reaction taking place between the above-mentioned transient, chemically reactive subcolloidal sodium-silico-aluminate (zincate) hydrosols and the inorganic cross-linking salts leads to an ultrarapid formation of complex (multicomponent) calcium-silico-aluminate (zincate) or similar microgels, made up of networks of macromolecules of a polymer-polycondensate type. The colloidal consequences of the in-situ (in the furnish) formation of these complex microgels are an instantaneous, indiscriminate and complete flocculation (coflocculation) of any, and all, particulates present in the furnish in question.

It should be emphasized that the primary reagents used in the first stage of the process of the formation of complex microgels, i.e., sodium silicate and sodium aluminate (zincate), must first react with each other to form the transient, chemically reactive subcolloidal sodium-silico-aluminate (zincate) hydrosols before any complex microgels can be formed (in the second stage of the process) by cross-linking these subcolloidal hydrosols with bivalent and/or multivalent inorganic salts. Hence, the subcolloidal sodium-silico-aluminate (zincate) hydrosols which, along with the inorganic cross-linking salts, are the factual microgel-forming agents, must be considered as "higher-rank" reagents synthesized in situ from the primary reagents, i.e., sodium silicate and sodium aluminate (zincate). If the latter individual reagents reacted directly (on their own) with a cross-linking salt, e.g., calcium chloride, the products of such reactions would be merely suspensions, or precipitates, of solid, more or less crystalline particles of calcium silicate or calcium aluminate (zincate), respectively, but not microgels, let alone complex microgels, which, by definition, must contain at least three different chemical building blocks in their macromolecular make-up.

The complex functional microgels used in practicing the present invention are formed in a virtually instantaneous manner. It is estimated that the chemical reaction of polycondensation between the low-molecular-weight, subcolloidal hydrosols mentioned previously and the bivalent and multivalent inorganic salts is completed in less than one microsecond. The consequences of this polycondensation are further manifested in a very rapid propagation of association between calcium-silico-aluminate (polymer-polycondensate) macromolecules, bringing about, within a couple of milliseconds, the development of colloidal formations with useful molecular weights that may reach billions. It is primarily this rapid continuous growth ("sweep") of molecular weights across such an enormously broad range which is deemed responsible for the instantaneous, indiscriminate and complete flocculation of even the most heterodisperse and polydisperse colloidal systems known in the art, regardless of these systems' physical, chemical or colloidal make-up.

Whereas the complex (multicomponent) microgels used in practicing the present invention were hitherto completely unknown, the transient, chemically reactive subcolloidal hydrosols employed in the synthesis of these microgels need some elaboration to distinguish them from other, deceptively similar, systems of the prior art. In view of the confusion and lack of standardization in the present colloid-chemical terminology, a fundamental treatment of the subject matter of the present invention and a brief chronological review of the related prior art is deemed necessary.

It is essential to point out that the era of an intense worldwide interest in natural and synthetic silica and silico-aluminate materials commenced with the key discoveries of 1) water-soluble sodium silicates ("water glass") by Johann Nepomuk yon Fuchs (1774–1856), who also suggested numerous practical applications for these interesting chemicals, encompassing adhesives, cements, flame retardants for paints, detergents, soap builders, dyeing adjuvants, metal fluxes and fertilizers;
2) metallic aluminum in 1825 by Oerstedt and Woehler, with most of the inorganic chemical compounds of this element known today having been described in the professional literature by countless scientists within the next few decades; and
3) ion-exchange properties of soils, which are natural alumino-silicates, by J.T. Way in 1850.

The rapidly following discoveries of many other commercially valuable properties of silica and alumino-silicate minerals, e.g., in the application to the desiccation of gases, clarification of water, removal of color impurities from edible and mineral oils, or manufacture of pigments and catalysts, triggered intensive research efforts in the field of silica and alumino-silicates. These efforts were directed both towards improving the performance properties of naturally occurring materials as well as producing analogous or yet unknown synthetic materials with yet more improved or even entirely novel properties.

Due to the similar dimensions of ionic radii of $Si^{4+}$ and $Al^{3+}$ (0.41 Å and 0.50 Å, respectively), as well as an overwhelming abundance of these two elements in the lithosphere, countless forms of alumino-silicate minerals have been synthesized in nature by geochemical processes. The potential number of synthetic alumino-silicates, on the other hand, is virtually unlimited. That such an enormous variety of chemical compounds, characterized by distinct physical and colloid-chemical properties, can be synthesized using just one or two of the four simple, easily available reagents, i.e., sodium silicate, silicic acid, sodium aluminate and alum, has no precedent in the inorganic chemistry.

Thousands of patents issued in the past 150 years for synthetic silica and alumino-silicate products obtained with the aid of the above-mentioned reagents relate essentially to only three principal colloidal systems, namely, gels, sols and precipitates. The incredible diversification of the forms and properties of products synthesized with the aid of the same few reagents may be explained by accepting the hypothesis that colloids are the lowest-rank systems known in nature equipped with "memory." It is the latter which makes the colloids "remember" their history in chronological detail and react accordingly, as manifested in terms of their resultant material properties and functional behavior. Hence, any intentional, or even accidental, deviation from an established synthesis procedure, or reaction conditions, will bring about inescapably certain differences, mostly quantitative but sometimes profoundly qualitative, in the constitution and/or functional properties of the resultant colloidal systems. Indeed, the thousands of similar, or even virtually identical, patented synthetic silica and alumino-silicate products differ among each other merely with respect to relatively minor quantitative compositional variations, procedural modifications in their synthesis (such as pertain to the concentrations and orders of addition of reagents, pH ranges, temperature conditions and aging regimes), modified physical properties and new areas of application.

How even a seemingly minor processing detail may be decisive to the very usefulness of a synthetic alumino-silicate product may be illustrated, for example, by U.S. Pat. No. 2,757,085 to Paquin. As disclosed therein, satisfactory color-reactive alumino-silicate pigments, synthesized in situ in a papermaking furnish, could be obtained only if sodium aluminate was introduced into the furnish first, followed by the addition of sodium silicate, but not vice-versa. Similarly, U.S. Pat. No. 4,213,874 to Williams et al. teaches that satisfactory amorphous sodium alumino-silicate base exchange materials could be synthesized only if, among other things, the proper sequence and rate of addition of the reactants were maintained during the precipitation process.

The critical dependence of a successful preparation of colloidal systems on maintaining strictly defined process parameters and conditions is perhaps best summarized by S. Voyutsky in his textbook of *Colloid Chemistry* (Page 269, second paragraph), Mir Publishers, Moscow, translated into English in 1978: "Colloidal systems can be obtained by various chemical reactions: exchange, reduction, oxidation, hydrolysis, and so forth. But colloidal systems are not always formed in reactions Capable of producing sols; they are formed only (underlining added by the applicant) at definite concentrations of the initial substances, at definite order of their mixing and temperature, and when some other conditions are met."

The preferred transient, chemically reactive subcolloidal hydrosols for practicing the present invention are soluble sodium-silico-aluminates, synthesized upon the introduction of solutions of sodium silicate and sodium aluminate into the slurries of particulate raw materials ("furnishes") used for the manufacture of the aggregate-$TiO_2$ pigment products under discussion. As the result of an addition polymerization between the above-mentioned reagents, dimers, trimers and higher-rank oligomers evolve sequentially and continuously into very-low-molecular-weight sodium-silico-aluminate macromolecules of an anionic polyelectrolyte type. Due to the moderate concentrations of the reagents employed, but primarily due to the prompt cross-linking of the transient subcolloidal hydrosols in question (terminating further growth of their molecular weight), the evolving sodium-silico-aluminate macromolecules are very small, their estimated dimensions being only slightly larger than 1 nm.

Such highly disperse systems represent special borderline solutions classified dimensionally above solutions of crystalloids (simple molecules or ions), but below colloidal solutions, e.g., those of starch, protein or polyacrylamide. A scientifically appropriate term "subcolloidal hydrosols" has been systematically used henceforth in referring to these systems, which should be distinguished from aquasols (hydrosols) of the prior art which are aqueous suspensions of solid particles with dimensions ranging from about 5 nm to 100–200 nm in diameter.

Historically, the terminology used in colloid chemistry has been developed in connection with the basic investigative tools available at the inception of the branch of science in question, namely, the conventional light microscope and ultramicroscope. The old-fashioned light microscopes, equipped with low-aperture objectives, could hardly resolve particles smaller than 200 nm in diameter; hence, such particles were referred to as "submicroscopic." On the other hand, ultramicroscopes, utilizing the Tyndall effect, made it possible to observe, though not resolve, particles as small as 5 nm in diameter. Hence, colloidal systems became traditionally the domain of ultramicroscopical investigations and their classification as "ultramicroscopic," with particle dimensions ranging from 5 nm to 200 nm, still has a great deal of validity for most practical applications. Regrettably, some less rigorous colloid textbooks still routinely specify the colloidal dimensions as extending from 1 nm to 500 nm, or even 1 $\mu$m (1000 nm).

Modern scientific research has established unequivocally, however, that the traditional delineation between "colloidal" and "noncolloidal" (crystalloid) systems, established solely on the basis of the dimensions of particles of the disperse phase, has no scientific foundation. Hence, contemporary scientific doctrines refute the concept of "colloids" and "crystalloids," interpreted in the past in a rather absolute sense, accepting instead the existence of a very specific "colloidal state" associated with disperse systems conforming to the established criteria of "colloid-like" behavior. The reasons for this can be illustrated rather clearly using the example of sodium chloride, which behaves as a typical crystalloid in aqueous solutions and a typical colloid in benzene solutions, numerous other such systems already having been identified.

Many experimental findings made during the studies of extremely disperse systems attest particularly clearly to the uniqueness of the particle-dimension interval extending from 1 nm to 5 nm, in which the colloidal and crystalloid states overlap and deficiencies of the imperfect colloid-chemical nomenclature are most evident. Hence, an unambiguous treatment of disperse systems of the above type frequently makes defining them in fundamental terms virtually mandatory, as has been established in dealing with many extremely important media such as surfactants, dyes, toxins and antitoxins. For example, the dimensions of individual molecules of some of the above-mentioned materials are larger than 1 nm (10 Å), considered as the conventional upper limit of crystalloid particles, but smaller than 5 nm (50 Å), considered as a practical lower limit for typical colloidal particles. Since the behavior of such systems overlaps the domains of both crystalloids and colloids, some authors have introduced the rather artificial term "semicolloids" to deal with these unusual solutions. Still other authors refer to such highly disperse systems, with particle dimensions ranging from 1 nm to 5 nm, as "amicrons" (subcolloids), as distinguished from "submicrons," applying to systems with particles larger than 5 nm in diameter.

Perhaps the most unfortunate aspect of colloid-chemical terminology is that the term "aquasol," and the equivalent term "hydrosol," in which the suffix "sol" stands for "solution," are used in referring to suspensions of ultramicroscopic solid particles in water. Although aquasols (hydrosols) do indeed appear as translucent (opalescent) solutions to an unaided eye, the latter, fundamentally incorrect terms complicate the clarity of the issue when the scientific discourse revolves around systems of overlapping behavior (e.g., crystalloid/subcolloid or subcolloid/colloid) or extends beyond professional circles. It should be pointed out, though, that many rigorous colloid scientists systematically employ the scientifically correct term "suspensoids" in referring to aquasols (hydrosols) of the prior art.

The above-mentioned, nomenclature-related problems become yet more complicated in dealing with novel subject matter, such as the subcolloidal sodium-silico-aluminate or similar hydrosols used to synthesize the complex microgels at the foundation of the present invention. The latter subcolloidal hydrosols constitute borderline solutions of transient, chemically reactive polyanionic molecules. As solutions, they have the appearance of completely clear, plain water, are totally devoid of any solid particles and do not exhibit the Tyndall effect.

The transient character of these continuously changing subcolloidal sodium-silico-aluminate and similar hydrosols renders the underlying oligomers and macromolecules fundamentally undefinable in terms of the exact physical dimensions or chemical compositions. This is understood best when considering that the reaction of addition polymerization, commencing with the moment the solutions of sodium silicate and sodium aluminate become introduced into the reaction space, proceeds continuously. Hence, even if there were a method capable of determining, at any given instant, the dimensions, molecular weights, or chemical composition of the evolving macromolecules, such information would become obsolete in the very subsequent instant.

It is possible, however, to objectively define the unique systems mentioned above using criteria of the philosophy of science. According to these criteria, the continuously changing, transient subcolloidal hydrosols cannot be classified as "materials" in a conventional sense in that they have no definite (fixed) form, mass or properties by which a "material" is conventionally described or defined, e.g., in textbooks of material science. Instead, the latter systems containing solute subcolloidal sodium-silico-aluminate or similar macromolecules, representing a very specific "material state," can be defined in terms of (a) detailed description of the reaction medium and conditions at the onset of the synthesis of the systems (hydrosols) in question, i.e., at the point of time (t) where t=0; and (b) an arbitrary subsequent point of time (t=x). The latter means that if the in-situ synthesis of an arbitrary transient subcolloidal hydrosol is initiated at a time t=0, using identical reagents, reagent proportions and concentrations, sequences and rates of reagent addition, temperature, pH and all other effective reaction conditions and process parameters, then, and only then, the resultant transient subcolloidal hydrosol will be exactly the same each time when passing through a subsequent fixed point of time $t=c$ ($x=c$).

While the above-discussed, continuously evolving (in statu nascendi) subcolloidal systems, e.g., sodium-silico-aluminates, are undefinable in conventional (material) terms, it is also completely certain that they are different from any existing natural or synthetic substances of the same nominal chemical compositions. By contrast, all sols known in the prior art are classified as "phaseal" colloids, the latter term indicating that the disperse phase is identical to an analogous phase existing on a macro scale and, in principle, could be obtained from the latter with the aid of mechanical comminution or other preparatory methods.

The transient aspects of the subcolloidal sodium-silico-aluminate hydrosols used in practicing the present invention must be particularly strongly emphasized since the process of addition polymerization between sodium silicate and sodium aluminate is a continuous one. Hence, at some advanced stage of polymerization (aging), particles of the above-mentioned subcolloidal hydrosols acquire sufficiently high molecular weights to exceed the solubility limits and transform into conventional (prior-art) aquasols, i.e., colloidal suspensions of solid particles. The period of aging necessary to initiate such a transformation may extend from a couple of seconds to several days, depending on the concentration of sodium silicate and sodium aluminate (zincate) in the reaction medium, and is manifested by the appearance of the Tyndall effect.

As is understood by those skilled in the art, the chemical reactivity of the subcolloidal hydrosols in question, i.e., the ability to form complex microgels by a process of chemical cross-linking carried out with the aid of bivalent (multivalent) inorganic salts, decays with the increasing degree of polymerization (aging) and is lost almost completely when the solute particles transform into solid ones (such as are typical of conventional sols) after exceeding the solubility limits. It is important, therefore, that the second stage of the in-situ synthesis of complex microgels, in which the above-mentioned subcolloidal sodium-silico-aluminate or similar hydrosols are chemically cross-linked with the aid of bivalent and/or multivalent inorganic salts, be carried out before the advent of the Tyndall effect. In full-scale production-plant installations working in a continuous process mode, the above cross-linking is usually carried out within a period ranging from a couple of seconds to a couple of minutes counting from the moment the solutions of sodium silicate and sodium aluminate are introduced into the pigment furnish.

The primary purpose of the above complex functional microgels is to induce an instantaneous, indiscriminate and complete flocculation (coflocculation) of all disperse raw materials present in the pigment furnish. Flocculation phenomena play a fundamental role in the manufacture of aggregate pigments by wet methods; however, the flocculation processes of the prior art are slow, selective (rather than indiscriminate) and incomplete. As a consequence, these processes are not well suited for the manufacture of aggregate pigments that are free of detrimental selective flocculation and fractionation of the disperse phases, by species and size, resulting in serious performance deficiencies of the end products. As a matter of fact, many waterborne highly disperse colloidal systems cannot be flocculated (precipitated) at all with the aid of the flocculating agents and processes known in the prior art. In the applicant's diversified experimentation, however, no waterborne colloidal system was yet encountered, regardless of how complex or difficult, able to resist the overpowering, instantaneous, indiscriminate and complete flocculating action of the in-situ-formed complex functional microgels used in practicing the present invention.

The secondary purpose of the complex functional microgels in question is to provide an arbitrary level of intrinsic cementation to aggregated pigment particles. Since the above complex microgels are outstanding hydraulic cements in their own right, an adequate interparticle bonding can be established by merely aging the flocculated pigment slurries, or cakes obtained by filtering these slurries, for a period ranging from a couple of hours to a few days. An important additional benefit of hydraulic curing is that the final particle-size distributions, called for by product specifications, does not require the customary comminution in a dry state (requiring the use of pulverizing equipment) but is obtained readily with the aid of inexpensive high-shear agitation of fluidized (dispersed) filtercakes. With furnishes which, in addition to the principal pigmentary and/or subpigmentary raw materials, also contain organic dyes, carbon black and organic, cationically active chemical compounds with at least two reactive groups in each molecule, the flocculated slurries usually require filtration, drying and pulverization to obtain an adequate mechanical integrity as well as the desired particle (aggregate)-size distribution.

The mechanical strength of the resultant pigment aggregates is controlled primarily by varying the dosage of the hydraulically or thermally cured microgel cements. The curing is both faster and more complete at higher drying temperatures, however, precautions must be taken if sensitive organic components are built into the aggregate-pigment structure. The mechanical strength of pigment aggregates can be yet further increased by coflocculating water-disperse and/or water-soluble polymer adhesives with the pigmentary raw materials, enabling the resultant aggregates to withstand even the most stringent shearing regimes to be encountered in practical end-use applications.

It should be pointed out that the adhesive action of the above complex microgels is possible only because the microgel particles, formed in situ under the application of very high shearing forces, are extremely small and have an inherent deformability (prior to being cured, of course), enabling them to orient themselves effectively in discrete, ultrathin formations embedded between the individual pigment particles to be cemented. As is readily understood by those skilled in the art, only true microgel particles, but not solid aquasol particles or precipitates, are capable of such a deformation.

The tertiary purpose of the complex microgels in question is to impart various desirable material and functional properties to the aggregated and cemented pigment products, important from the standpoint of these products' end-use applications. The above effects can be realized through a modification of the inherent physical and/or surface-chemical properties of the above microgels, e.g., by chemically incorporating organic, cationically active compounds (having at least two reactive groups in each molecule) into the macromolecules which make up the microgels under discussion. As a consequence, a steric matrix of discrete organophilic (hydrophobic) sites can be imparted to aggregate pigments synthesized with the aid of the above complex microgels of a hybrid, inorganic/organic polymer-polycondensate type. By controlling, at will, the level of such organophilic (hydrophobic) properties, aggregate-$TiO_2$ pigments can be formulated amenable to an easy and uniform dispersion in organic media, rendering these pigments uniquely suited for such applications as filling of synthetic fibers and plastics, or the manufacture of solvent-based lacquers and paints.

The in-situ synthesized complex functional microgels can also be used for an indirect modification of the functional and surface-chemical properties of the resultant aggregate-$TiO_2$ pigment products under discussion in that the microgels in question make it possible to coflocculate, along with pigmentary constituents, such potent surface-chemical modifiers in their own right as emulsion polymers or organic dyes.

The principal reagents of commercial significance for the synthesis of the complex (multicomponent) functional microgels used in practicing the present invention are as follows:

(1) alkali-metal silicates and quaternary ammonium silicates, preferably sodium silicate; (2) alkali-metal aluminates, alkali-metal zincates and blends thereof in any proportions, preferably sodium aluminate; and (3) water soluble, essentially colorless, bivalent and multivalent salts of calcium, magnesium, barium, aluminum, zinc, and zirconium, preferably calcium chloride or calcium nitrate.

The pH of flocculated pigment furnishes ranges usually from 8 to 12.5 (depending to a large extent on the initial acidity of the process water employed) when neutral bivalent and/or multivalent inorganic salts are employed as the cross-linking agents. Aluminum sulfate, alone or in combination with calcium chloride and/or other equivalent inorganic cross-linking salts, can be employed when lowering of the pH of the flocculated pigment furnish is desired. In addition to, or instead of, aluminum sulfate, sulfuric acid and/or other common acidifying agents can also be employed for the above purpose.

There is a great latitude with regard to the quantitative and qualitative compositions of the (intermediate) transient, chemically reactive, subcolloidal sodium-silico-aluminate or similar hydrosols and (final) complex microgels used in practicing the present invention without detriment to their intended functions. For example, the acceptable ratio of sodium silicate to sodium aluminate, sodium silicate to sodium zincate, or sodium silicate to the combined mass of sodium aluminate and sodium zincate employed in forming the above subcolloidal hydrosols can be varied from 10:1 to 1:10, by weight. As was established in extensive trials, a preferred ratio is 1:1.

The workable concentrations of sodium silicate in the reaction medium (pigment furnish) range from 0.1% to 2%, by weight, the same pertaining to the concentrations of sodium aluminate, sodium zincate or combinations thereof. The use of reagent concentrations exceeding 2%, by weight, leads to a rapid molecular-weight growth of sodium-silico-aluminate (zincate) macromolecules, reducing the latters' chemical reactivity toward the inorganic cross-linking salts. To sustain a sufficient level of this reactivity for synthesizing complex functional microgels with adequate flocculating and cementing properties, the transient subcolloidal hydrosols evolving from such concentrated reagent solutions should be cross-linked within a period of only a couple of seconds, which requires the use of sophisticated, powerful in-line mixers/reactors.

The ratio of calcium chloride or equivalent inorganic cross-linking salt(s) to the combined mass of the transient, chemically reactive subcolloidal hydrosols to be cross-linked can vary from 1:10 to 10:1, by weight, but the simple ratio of 1:1 was found to be most satisfactory for synthesizing in situ complex functional microgels with adequate flocculating and cementing efficacies. The amount of calcium or equivalent bivalent and multivalent ions present in the reaction medium should optimally exceed by at least 50% the quantity of such ions bound chemically by the above-mentioned transient subcolloidal hydrosols. As was determined by a chemical analysis of filtrates from complex microgels synthesized in plain water, the latter excess of cross-linking ions reduces the residual concentration of the unreacted silicate and aluminate (zincate) molecules to just a few parts per million.

It should be emphasized that the formation of both the (intermediate) transient, chemically reactive subcolloidal sodium-silico-aluminate or similar hydrosols and the (final) complex functional microgels, used in practicing the present invention, are not stoichiometric. Identical transient subcolloidal hydrosols, as well as resultant complex microgels, are synthesized each time, however, when the same compositions, concentrations, proportions, dosages, sequences and rates of addition of the reagents, and prescribed reaction conditions are maintained precisely during the synthesis.

As is typical of ultrafast chemical reactions in aqueous media, the in-situ formation of complex functional microgels used in practicing the present invention is practically independent of the temperature of the reaction medium. The above microgels can thus be formed, in principle, within the entire temperature interval in which water remains fluid, provided that the stability of the reagents is not affected at elevated reaction temperatures. A special consideration, for example, should be given to the limited thermal stability of solutions of sodium aluminate.

The above virtual independence of the synthesis process from thermal conditions and regimes is a unique feature of the above complex microgels, which becomes readily apparent when comparisons are made with the methods of preparation of even much simpler monocomponent or bicomponent colloidal systems, such as silica or alumino-silicate gels or aquasols (colloidal suspensions of solid particles) known in the prior art. For example, countless patents disclosing various methods of manufacturing pharmaceutical preparations, ion exchangers, catalysts and other products based on extraneously, or in-situ prepared gels, aquasols or precipitates, sometimes of identical chemical composition, often differ merely with respect to some seemingly minor, though critical to these end products' successful synthesis, variations in the thermal regimes. The broad latitude with regard to the reaction conditions, reagent composition and concentrations, and other process parameters tolerable in synthesizing the complex functional microgels under discussion is unique in the above context, being indicative of the enormous efficacy of the general colloid-chemical system used in the preferred mode of practicing the present invention.

A still more detailed discussion of the subject matter of the above complex functional microgels is provided in the specification to the previously mentioned co-pending patent application Ser. No. 07/775,025, now abandoned.

The principal concepts at the foundation of the present invention, encompassing, among other things, in-situ aggregation of TiO$_2$-pigment fines and controlled pigment-lattice expansion of TiO$_2$-particle aggregates, were derived on the basis of the following premises:

(1) Applicant's discovery of the beneficial effect of an in-situ aggregation of subpigmentary fractions (pigment fines) on the light-scattering properties of the resultant pigment formations (coatings), published in the previously mentioned article in *TAPPI Journal*, Vol. 53, No. 11, 1970.

(2) The experimental results of applicant's extensive research and development work pertaining to scientific foundations of designing and synthesizing new types of aggregate pigment products having both novel functional properties as well as increased optical-performance efficacy.

(3) Vast amounts of practical experience gathered from commercial paper-mill utilization and extensive trial runs of a variety of other (related) aggregate-pigment products manufactured commercially with the aid of applicant's technology disclosed in the previously mentioned U.S. Pat. No. 5,116,418 and the U.S. Pat. Nos. 5,279,633 and 5,312,484.

(4) Extensively documented inherent potential of the in-situ synthesized complex functional microgels, enabling one to continuously and arbitrarily (virtually at will) expand the statistical pigment lattice within TiO$_2$-particle aggregates.

(5) Reasoning processes employing methods and criteria of the philosophy of science, which, among other things, point directly to the adaptability of other methods of pigment aggregation, known in the prior art, to the synthesis of aggregate-TiO$_2$ pigment products in accordance with the fundamental concepts of the present invention.

For example, according to the principles of the philosophy of science applied to the science and technology of materials, TiO$_2$ is classified as a unique chemical substance (defined more specifically by criteria used in the inorganic chemistry) combining titanium and oxygen. In an analogy, kaolin (as alumino-silicate), calcium carbonate, silica or calcium silicate are also classified as unique chemical substances in their own rights. In contrast, pigments (e.g., white pigments as the case in point) represent merely a pragmatic class of useful, nonunique materials equipped with certain typical optical and end-use properties as defined by conventions established in the trade; hence, neither TiO$_2$ nor any other particulate material classified as a pigment is unique in any way, the differences among all members of the class of pigments being purely quantitative. Accordingly, the qualitative rules pertaining to the colloid-chemical, physical or optical behavior (performance) of any single pigment, e.g., those defining the effect of particle morphology, aggregation or spatial distribution upon the resultant optical-performance efficacy of aggregate formations, pertain without exception to all particulate materials classified as white pigments.

By way of an example, TiO$_2$ has a substantially higher refractive index than kaolin, which represents a distinctive quantitative advantage from the standpoint of optical-performance efficacy. On the other hand, the relative density of TiO$_2$ is substantially higher than that of kaolin, which is a distinctive quantitative disadvantage in that pigments are purchased by weight, but their optical performance depends on their volume. Another negative feature of TiO$_2$ as a pigment is associated with its spherical particle shape, the spherical particles being prone to forming densely packed formations detrimental to efficient light scattering. In comparison, clay particles are highly anisometric and, their considerably lower optical-performance potential being considered, permit one to utilize a relatively much larger portion of this potential in end-use applications than is possible with the spherical particles of TiO$_2$.

In accordance with the foregoing considerations, TiO$_2$ pigments must also react to aggregation, in general, and a controlled, beneficial aggregation of pigment fines, in particular, in a fundamentally identical manner as would all other white pigments. It should be emphasized in the strongest possible terms, however, that the above, seemingly elementary, conclusion has not been reached heretofore by anybody else to the best of the applicant's knowledge, even though more than twenty years have passed since the beneficial effects of aggregation of pigment fines on light-scattering efficacy were demonstrated by the applicant in the previously mentioned article published in *TAPPI Journal*. Most importantly, the above conclusion has not been arrived at in the prior art despite a vast pool of experts skilled in the art being active for 72 years in the field of TiO$_2$ pigment research and development in the scientifically and technologically highly advanced and rich-in-resources TiO$_2$ pigment industry.

As a matter of fact, the principal concept at the foundation of the present invention, i.e., intentional, controlled permanent aggregation of TiO$_2$ particles by themselves, constitutes a revolutionary departure from the ironclad doctrines and teachings of the prior art, calling for counteracting the aggregation of TiO$_2$ pigment particles in every way practically feasible. Indeed, the history of TiO$_2$ industry, whose origin dates back to 1919, is a chronicle of incessant attempts and approaches directed towards the prevention of TiO$_2$ aggregation, both in storage and end-use application, as is evidenced, among other things, by (a) successful development of composite TiO$_2$ pigment products in which particles of TiO$_2$ were coprecipitated and intimately homogenized with ultrafine low-refractive-index extenders (barium or calcium sulfate), and then permanently immobilized by calcining (the commercial production of these pigments was discontinued around 1970 for reasons unrelated to the basic concept, which was fundamentally sound);

(b) utterly unrealistic and futile attempts to permanently interspace fine-particle-size TiO$_2$ pigments with disproportionately oversized extraneous extender pigments of the prior art;

(c) extension of loose TiO$_2$ pigment particles with loose extender particles, routinely practiced in the paper and paint industries to the present day; and (d) contemporary practice of surface coating of TiO$_2$ particles with alumino-silicate gels.

The significance of the beneficial in-situ aggregation of pigment fines, independent of the pigments' chemical constitution or physical properties, is illustrated by the data in Example I in which the opacifying efficacy of a commercial loose (unadulterated) TiO$_2$ pigment is compared with that of a commercial low-refractive-index aggregate pigment made of a raw material derived from a kaolin crude.

EXAMPLE I

Handsheets with a basis weight of 65 g/m$^2$, having opacity of 70% and brightness of 86% in the unfilled state, were prepared with the aid of a laboratory sheet former at various filler-loading levels. One of the fillers employed was a typical commercial TiO$_2$ pigment (defined previously), further referred to as TiO$_2$-Control. The other filler was a commercial structural aggregate pigment, further referred to as SAP, synthesized from a very-fine-particle-size clay as the raw material with the aid of the procedure outlined in Example I of the specification of the previously mentioned U.S. Pat. No. 5,116,418 to Kaliski.

The opacity increments determined for ten consecutive one-percentage-point increments of filler loading in the handsheets, ranging from 0–1%, by weight, to 9–10%, by weight, are shown in Table 1. The opacity data in this table provide a great deal of insight into the radically different effects of wet-end flocculation of two fundamentally different types of fillers (i.e., aggregated versus loose) on these fillers' opacifying performance, clearly pointing to radically different flocculated-filler structures (steric configurations) within the fibrous matrix.

TABLE 1

| FILLER-LOADING INCREMENTS %, BY WEIGHT | OPACITY INCREMENTS, TiO$_2$-Control | %-POINTS SAP |
|---|---|---|
| 0–1 | 4.8 | * |
| 1–2 | 3.6 | 1.0 |
| 2–3 | 2.6 | 1.2 |
| 3–4 | 1.8 | 1.1 |
| 4–5 | 1.6 | 1.1 |
| 5–6 | 1.4 | 1.1 |
| 6–7 | 1.1 | 1.1 |
| 7–8 | 0.9 | 1.0 |
| 8–9 | 0.7 | 1.0 |
| 9–10 | 0.6 | 1.0 |

*negligible, not measured

The deterioration of the opacifying efficacy of TiO$_2$ with the increasing filler-loading level in the sheet, shown by the data in Table 1, is outright striking, the latter efficacy being eight times higher for the initial filler-loading interval of from 0 to 1%, by weight, than for the interval of from 9 to 10%. Equally striking is the virtual lack of an analogous decay of the opacifying efficacy of SAP (commercial structural aggregate pigment) when the filler-loading level is similarly increased. Although the commercial structural aggregate pigment, consisting exclusively of low-refractive-index materials, is clearly a much weaker opacifier than TiO$_2$-Control at the lower filler-loading levels, it provides the same opacity increment as TiO$_2$-Control (1.1 percentage point) for the filler-loading interval of from 6 to 7%, by weight, and a higher one than TiO$_2$-Control (1.0 versus 0.6 percentage point) for the filler-loading interval of from 9 to 10%, by weight.

It is worth pointing out that the very-fine-particle-size ("high-glossing") clay used as the raw material for synthesizing the aggregate pigment (SAP) under discussion is the weakest opacifier of all white pigments on the market, its light-scattering performance being about 10 times lower than that of TiO$_2$.

As far as a physical "crowding" of pigment particles is concerned, one should bear in mind that TiO$_2$ (rutile), with a relative density of 4.21 g/cm$^3$, occupies less than 0.2% of the combined solid volume of cellulosic fibers and filler at the filler-loading level of 1%, by weight, and less than 2% at the filler-loading level of 10%, by weight. Considering also that the porosity of the handsheets is on the order of 50%, the factual spatial concentrations of TiO$_2$ particles are automatically 50% lower than the preceding numbers indicate; hence, such concentrations could hardly be referred to as "crowded." In comparison, SAP, with a relative density of about 2.5 g/cm$^3$, occupies about 1.6 times larger solid volume than TiO$_2$ thus must be considered 1.6 times more "crowded" at comparable filler-loading levels. Obviously, then, the rapid decay of the opacifying efficacy of TiO$_2$ with the increasing filler-loading levels cannot be explained logically with the aid of particle-crowding doctrines of the prior art, particularly since an analogous decay of the opacifying efficacy was not observed with the aggregate-pigment SAP, as is evident from the data in Table 1.

According to applicant's hypothesis, the universally known rapid deterioration of the opacifying efficacy of TiO$_2$ with increasing filler-loading levels should not be explained in terms of particle crowding, interpreted hitherto in an arithmetic fashion, but, instead, in terms of these particles' comprehensive spatial distribution. The polydisperse populations of spherical TiO$_2$ pigment particles are extremely prone to excessive flocculation, particularly when used at higher concentrations in the system, resulting in the formation of dense flocs suppressing this pigment's outstanding inherent light-scattering potential which, considered strictly from the standpoint of physical optics, is higher than that of any other white pigment. In comparison, SAP is clearly very resistant to a similar detrimental flocculation, this resistance, according to applicant's hypothesis, being a universal performance property of all properly formulated aggregated pigments.

The above hypothesis of beneficial aggregation, verified in the past in application to low-refractive-index pigmentary and subpigmentary particulates, as well as blends of low-refractive-index extenders with TiO$_2$, was employed toward the improvement of the optical-performance efficacy of conventional TiO$_2$ pigments (used as the sole pigmentary raw materials) in accordance with the example to follow.

EXAMPLE II

A series of three aggregate-TiO$_2$ pigment samples was prepared from a commercial rutile pigment, defined previously, using the following laboratory procedure:

A 500 g batch, dry weight, of a well-dispersed 70%-solids slurry of rutile was placed in a 4-liter stainless steel beaker. A powerful drill press equipped with a high-lift stirrer was employed to provide an intensive agitation of the system (pigment furnish) during the synthesis process.

Separate solutions of sodium silicate and sodium aluminate, prepared at 5% solids, were poured simultaneously from plastic cups placed at diametrically opposite sides of the beaker into the agitated rutile slurry, previously diluted with water from the original 70%-solids concentration (see below). After an interval of about 20–120 seconds from the moment of addition of the above-mentioned reagent solutions, a 5% solids solution of calcium chloride was poured into the agitated system. The instantly flocculated slurry was aged from 2 to 12 hours and then filtered and rinsed.

The resultant filtercake was divided into two portions, one of which was dried, pulverized and made down into a well-dispersed 50%-solids slurry using a blend of 1%, by weight, of tetrasodium pyrophosphate and 0.5%, by weight, of Dispex N-40 (a polyacrylate compound) as the dispersants. The other portion of the filtercake was made down directly into a slurry in the state "as is" (using a hydraulic curing of the microgel cement instead of drying), with the same dosages of the above-mentioned dispersants being employed.

Slurries of the aggregate-$TiO_2$ pigment samples synthesized with the aid of the "dry" approach, involving drying and pulverization, have a suffix "D" (for dry) in their designation, e.g., AGG224-D. Analogously, aggregate-$TiO_2$ pigment samples synthesized with the aid of the "wet" approach, employing the hydraulic curing of the microgel cement and a high-shear agitation of the resultant filtercakes (for a controlled size reduction of the "raw" $TiO_2$-particle aggregates), have a suffix "W" (for wet), e.g., AGG224-W.

The first aggregate-$TiO_2$ pigment sample of the generic type AGG224 was made using 2 g of sodium silicate, 2 g of sodium aluminate and 4 g of calcium chloride per 100 g of rutile. Analogously, the second aggregate-$TiO_2$ pigment sample, designated AGG336, was made using 3 g of sodium silicate, 3 g of sodium aluminate and 6 g of calcium chloride per 100 g of rutile, and the third one, designated AGG448, was made using 4 g of sodium silicate, 4 g of sodium aluminate and 8 g of calcium chloride per 100 g of rutile, all weights referring to materials on an active basis.

Since the rutile slurry becomes progressively more viscous with higher dosages of the reagents introduced into the furnish, the initial 70%-solids slurry must be diluted with water to a workable consistency prior to the addition of the solutions of sodium silicate and sodium aluminate. Hence, the aggregate pigment samples described above were synthesized at about 30% solids for AGG224, 26% solids for AGG336 and 18% solids for AGG448, with even lower final furnish solids being called for at yet higher microgel levels, e.g., 5-5-10 or 6-6-12 in terms of grams (active basis) of sodium silicate, sodium aluminate and calcium chloride per 100 g of pigmentary and/or subpigmentary $TiO_2$ raw material.

Selected particle-size-distribution data for the aggregate-$TiO_2$ pigment samples prepared by both "wet" and "dry" approaches and the commercial rutile pigment ($TiO_2$-Control) used as the raw material for their synthesis are listed in Table 2.

TABLE 2

| SYSTEM: | % <2.0 μm | % <1.0 μm | % <0.3 μm | 100% < [μm] |
|---|---|---|---|---|
| $TiO_2$ Cont. | 100.0 | 98.5 | 48.5 | 1.5 |
| AGG224-W | 98.9 | 96.1 | 31.6 | 5.0 |
| AGG336-W | 96.7 | 90.7 | 25.2 | 5.0 |
| AGG448-W | 96.0 | 92.4 | 29.1 | 15.0 |
| AGG224-D | 96.4 | 90.5 | 18.7 | 15.0 |
| AGG336-D | 93.1 | 84.3 | 17.1 | 20.0 |
| AGG448-D | 90.4 | 79.7 | 13.3 | 10.0 |

The data in Table 2 clearly show that all aggregate-$TiO_2$ pigment samples are substantially coarser than the $TiO_2$-Control. Moreover, the above data also show that the particle size distributions of the aggregate-$TiO_2$ pigment samples made by both the wet and dry approaches become coarser with the increasing dosages of the in-situ-synthesized complex microgels. The single exception, recorded with the aggregate-$TiO_2$ sample designated AGG448-W, was caused by an excessive size reduction of $TiO_2$-particle aggregates during high-shear agitation of the hydraulically cured filtercake. It should be pointed out, though, that the existence of large aggregates with dimensions of 5-20 μm (see the extreme right column in Table 2), recorded by the particle-size analyser, could not be verified in absolute terms by microscopical observations.

The data in Table 2 also show that the aggregate-$TiO_2$ pigment samples prepared by the dry route, involving a thermal curing of the microgel cement, are coarser than the analogous samples prepared by the wet route involving a hydraulic curing of the microgel cement. The rate at which the particle-size distributions become coarser with increasing content of the microgel cement within a given series of aggregate-$TiO_2$ pigment samples (wet or dry) is also steeper for the dry series employing the more thorough thermal curing of the microgel cement. The principal reason for the above is that $TiO_2$-particle aggregates containing progressively higher contents of the thermally cured complex microgel cement are increasingly more difficult to comminute with the conventional clay-pulverizing equipment employed in the preparation of the aggregate-pigment samples under discussion. Finer particle (aggregate)-size distributions can be readily obtained, if so desired, using more efficient comminutors, such as ball mills.

The values of the light-scattering coefficients of the aggregate-$TiO_2$ pigment samples from Example II, listed in Table 3 below, were determined at the light wavelengths of 457 nm and 577 nm using binderless films with a basis weight of 4 g/m$^2$, deposited from 50%-solids pigment slurries on optically flat black glass plates as the coating substrates, in accordance with the procedure described by Kaliski in TAPPI Journal, Vol. 53, No. 11, 1970, Pages 2077-2084. A 50%-solids slurry of the previously defined commercial rutile pigment, used as the raw material for synthesizing the aggregate-$TiO_2$ pigment samples under discussion, was employed as a control.

TABLE 3

| SYSTEM | LIGHT-SCATT. COEFF., m$^2$/g $S_{457}$ | $S_{577}$ | Rho VALUE % |
|---|---|---|---|
| $TiO_2$-Control | 0.43 | 0.31 | 72.1 |
| AGG224-W | 0.57 | 0.43 | 75.4 |
| AGG336-W | 0.62 | 0.47 | 75.8 |
| AGG448-W | 0.60 | 0.46 | 76.7 |
| AGG224-D | 0.55 | 0.38 | 69.1 |
| AGG336-D | 0.61 | 0.45 | 73.8 |
| AGG448-D | 0.74 | 0.57 | 77.0 |

In accordance with the universally accepted doctrines of the prior art, the optical-performance efficacy of the aggregate-$TiO_2$ pigment samples under discussion should become progressively worse with the increasing degree of aggregation (coarsening of the aggregate size). As shown by the data in Table 3, however, the factual picture is diametrically opposite, the light-scattering coefficients of the aggregate-$TiO_2$ pigment samples not only being substantially higher than the light-scattering coefficients of the $TiO_2$-Control sample, but actually increasing with the coarsening of the size of $TiO_2$-particle aggregates. Hence, the light-scattering coefficient of the aggregate-$TiO_2$ pigment sample AGG224-D (lowest performer), determined at 457 nm ($s_{457}$), is 28% higher than that of the substantially finer $TiO_2$-Control while the same light-scattering coefficient of the aggregate-$TiO_2$ pigment sample AGG448-D (highest performer), which is coarser than sample AGG224-D, is 72% higher than that of the TiO$_2$-Control. Correspondingly, the light-scattering coefficients determined at 577 nm (s$_{577}$) are 27% higher for the aggregate-TiO$_2$ pigment sample AGG224-D and 90% for the aggregate-TiO$_2$ pigment sample AGG448-D than the analogous light-scattering coefficient of the TiO$_2$-Control.

It should be clarified at this point, however, that the improvement of optical prowess of the aggregate-TiO$_2$ pigment samples under discussion with the increasing coarseness of the aggregate-size distribution, apparent from the data in Tables 2 and 3, is far more complex than it may seem from the preceding correlations. For example, the light-scattering performance of sample AGG448 (having the coarsest aggregate-size distribution) was further improved by additional wet ball milling, which led to a significant reduction of the size of coarse aggregates insufficiently comminuted by the conventional pigment-pulverizing equipment traditionally used in the art. It is thus clear that the outstanding optical-performance efficacy of sample AGG448 was obtained not because of, but despite, the coarse aggregate-size-distribution, fully corroborating applicant's hypothesis that the optical-performance efficacy (opacifying, light-scattering, and so forth) of a pigment product depends primarily on the "comprehensive spatial distribution" of the individual pigment particles. With aggregate-pigment products, the comprehensive spatial distribution of the individual pigment particles is essentially predetermined (permanently fixed) by the aggregation itself and cannot be changed without aggregate breakup regardless of how the individual aggregates themselves are placed in the resultant end-use formations.

As is evident from the data in Table 3, the light-scattering efficacy of the aggregate-TiO$_2$ pigment samples, unlike that of the TiO$_2$-Control, is not affected perceptibly by particle crowding. One of the reasons underlaying the above is, for example, that the aggregate-TiO$_2$ pigment samples in question are pronouncedly thixotropic; hence, the freshly applied wet coating films become fully immobilized before the detrimental flocculation process can set in to any major extent. Even in the absence of thixotropy, however, populations of aggregate particles (devoid of loose pigment fines) are inherently less prone to a detrimental flocculation and dense packing than nonaggregated particle populations characterized by wide particle-size spreads. As was already pointed out in the preceding discussion of the article by Samygin, a wide particle-size spread facilitates the flocculation of small particles.

As is readily apparent from the data in Table 3, the increase of light-scattering coefficients of the aggregate-TiO$_2$ pigment samples relative to the TiO$_2$-Control sample cannot be ascribed to particle aggregation alone. For example, the light-scattering coefficients increase considerably with each increase of the microgel content in the aggregate-TiO$_2$ pigment samples in question. The inescapable consequence of the above increase of the content of the in-situ-synthesized microgel cement, however, is a progressive expansion of the pigment lattice formed by the aggregated TiO$_2$ particles.

The concept of pigment-lattice expansion in coating films by inclusion of binder has been well known in the prior art. According to Kaliski (*TAPPI Journal*, Vol. 53, No. 11, 1970, Pages 2077-2084), ". . . the spatial arrangements of pigment particles within the solidified binder media are characterized by certain statistical regularities, which cause a given pigment to impart reproducibly a given specificity to coatings prepared under the same conditions. As a consequence, the term 'statistical pigment lattice' is considered preferable to such frequently used terms as 'pigment skeleton' or 'pigment lattice,' which imply structural-mechanical functions and geometrical regularity, respectively."

The above concept of pigment-lattice expansion, which, to the best of the applicant's knowledge, was never utilized in the prior art in application to such discrete formations as pigment aggregates, shall be dealt with hereinafter in quantitative terms. For example, the aggregate-TiO$_2$ pigment samples AGG224-W and AGG224-D were synthesized using a total of 8 g of microgel-forming reagents per 100 g of TiO$_2$, 63% of which (the actual yield of the complex microgel formed from sodium silicate, sodium aluminate and calcium chloride used in the proportions mentioned), i.e., 5 g, dry weight, became embedded between the aggregated TiO$_2$ particles in the form of a calcium-silico-aluminate microgel cement. The latter microgel cement has a relative density of about 2.5 g/cm$^3$ when cured by drying, corresponding to a specific volume of 0.40 cm$^3$/g, and a relative density of about 2.4 g/cm$^3$ when cured hydraulically, corresponding to a specific volume of 0.42 cm$^3$/g. Accepting the value of 0,238 cm$^3$/g as the specific volume of rutile, one can calculate that the pigment-lattice expansion resulting from microgel-cement deposits embedded between the aggregated particles of TiO$_2$ is equal to 7.8%, by volume for AGG224-D and to 8.2%, by volume, for AGG224-W. Correspondingly, the analogous pigment-lattice expansions amount to 11.3%, by volume for AGG336-D; 11.8%, by volume, for AGG336-W; 14.4%, by volume, for AGG448-D; and 15.0%, by volume, for AGG448-W.

The increasing statistical pigment-lattice expansion brought about by increasing the microgel-cement content in the aggregate-TiO$_2$ pigment products under discussion is uniquely monitored with the aid of the Rho ($\rho$) parameter defined previously. This parameter is calculated according to the following formula:

$$\rho[\%] = (s_{577} \div s_{457}) \times 100$$

in which the symbols s$_{577}$ and s$_{457}$ denote the light-scattering coefficients determined for the light wavelengths of 577 nm and 457 nm, respectively.

For any given pigment, the lowest Rho value is obtained in the absence of flocculation. As the flocculation sets in, such as occurs invariably in freshly applied wet coating films, the intrinsic pigment structures, thus also the dimensions of the light-scattering sites within the resultant consolidated formations, become progressively coarser.

A direct consequence of the above-mentioned coarsening is a shift of the quantitative balance of light scattering in favor of the longer wavelength of light employed herein for the determination of the light-scattering coefficients, i.e., 577 nm, the numerical values of the Rho parameter becoming higher. As can be seen clearly from the data in Table 3, the numerical values of the Rho parameters increase with the increasing pigment-lattice expansion, i.e., the coarsening of the intrinsic pigment structures, with both the "wet" and "dry" series of the aggregate-TiO$_2$ pigment samples under discussion. As a matter of fact, the trend in the increase of the Rho values with the increasing content of the microgel cement, contributing to a further pigment-lattice expansion, also parallels the corresponding trend in the increasing coarseness of the particle-size distributions shown by the data in Table 2.

In terms of important supplemental information, it should be noted that the Rho parameter is unique only relative to a given system, being able to reveal some intrinsic structural changes in both discrete formations, such as pigment aggregates, and continuous formations, such as coating films, undetectable with the aid of tools or methods known in the prior art. The latter parameter cannot be used, however, for making comparisons between unrelated systems.

The concept of pigment-lattice expansion in application to both high-refractive-index and low-refractive-index particulates shall be more readily understood from the discussion of the following informative demonstration. In the demonstration in question, applicant synthesized an aggregate pigment from an ultrafine (subpigmentary) fraction, having virtually all particles finer than 0.1 μm e.s.d., extracted from a high-glossing kaolin clay with the aid of ultracentrifugation. The aggregate pigment was prepared using the procedure described in Example II, employing the in-situ-synthesized calcium-silico-aluminate microgel cement at the 2-2-4 level.

The light-scattering coefficients of both the ultrafine particulate raw material and the aggregate pigment made thereof were determined with the aid of binderless coating films on black glass plates, deposited from aqueous slurries of the above-mentioned materials. The coating films obtained from slurries of loose ultrafine particulates (100% finer than 0.1 μm e.s.d.) were translucent, their light-scattering coefficient ($s_{457}$) being equal to a mere 0.02 m$^2$/g. In contrast, analogous coating films obtained from slurries of the aggregate product were strikingly white (opaque) and had a light-scattering coefficient of 0.14 m$^2$/g, which constitutes an improvement of about 700% relative to the nonaggregated raw material. It should be pointed out in the above context that analogously determined light-scattering coefficients of the best conventional hydrous-clay pigment products on the market are equal to about 0.10–0.11 m$^2$/g.

As is readily understood by those skilled in the art, the enormous increase of the light-scattering performance obtained above was derived essentially only from the in-situ aggregation of pigment fines. Although it is obvious that the pigment lattice formed by the aggregated pigment fines is also expanded by the yet finer inter-particle deposits of the complex microgel cement employed for aggregation, the refractive indexes of both the pigment fines and the microgel cement are very similar. Consequently, no improvement of the light-scattering efficacy of the aggregated system under discussion can be expected from the physical presence of the complex microgel cement as such, the above improvement being derived exclusively, for all practical purposes, from the in-situ aggregation of pigment fines.

Completely different circumstances from the standpoint of physical optics occur, however, when a subpigmentary or pigmentary high-refractive-index TiO$_2$ becomes similarly aggregated and interspaced with ultrathin deposits of the low-refractive-index complex microgel cement. As is readily understood by those skilled in the art, the interspacing of TiO$_2$ particles with deposits of the low-refractive-index microgel cement plays a similar role in boosting the optical-performance efficacy of TiO$_2$ pigment as the building in of bubbles of air (having the very lowest refractive index) would play with formations consisting of conventional (low-refractive-index) pigments. Hence, the comprehensive improvement of the optical-performance efficacy of aggregate-TiO$_2$ pigment products, compared to that of the particulate TiO$_2$ raw materials from which they were synthesized, is derived both from the in-situ aggregation of TiO$_2$-pigment fines and physical expansion (stretching apart) of the aggregate-TiO$_2$ pigment lattice by ultrathin deposits of the calcium-silico-aluminate or similar complex microgels employed.

Since TiO$_2$ pigments are usually employed in industrial practice in combination with substantially less-expensive extender pigments, a number of 50%-solids composite slurries were prepared using blends consisting of 60%, by weight, of a fine-particle-size calcined-clay extender, the remaining 40%, by weight, being either a plain TiO$_2$ (TiO$_2$-Control sample) or the aggregate-TiO$_2$ pigment samples from Example II. The above composite slurries were used to assess the light-scattering performance of binderless coating films on black glass plates, in accordance with the procedure employed to obtain analogous data listed in Table 3. The resultant data are shown in Table 4.

TABLE 4

| SYSTEM | LIGHT-SCATT. COEFF., m$^2$/g | | Rho VALUE % |
|---|---|---|---|
| | $S_{457}$ | $S_{577}$ | |
| TiO$_2$-Cont./Calc. Clay | 0.38 | 0.29 | 76.3 |
| AGG224-W/Calc. Clay | 0.49 | 0.40 | 81.6 |
| AGG336-W/Calc. Clay | 0.52 | 0.44 | 84.6 |
| AGG448-W/Calc. Clay | n.d. | n.d. | n.d. |
| AGG224-D/Calc. Clay | 0.47 | 0.38 | 80.8 |
| AGG336-D/Calc. Clay | 0.49 | 0.39 | 79.6 |
| AGG448-D/Calc. Clay | 0.48 | 0.40 | 83.3 | n.d.: not determined

As is readily apparent, the data in the above table follow closely the same trends as the analogous data in Table 3, the noticeable across-the-board decrease of the light-scattering coefficients (relative to those posted in Table 3) being generally indicative of a dilution of a high-refractive-index material (TiO$_2$-Control sample or the aggregate-TiO$_2$ pigment samples) with a low-refractive-index one (calcined clay). As is also evident from the data in the above table, the rate of the relative decrease of the light-scattering efficacy is less pronounced with the TiO$_2$-Control sample than with the aggregate-TiO$_2$ pigment samples under discussion, as can be verified by comparing the light-scattering data listed in Table 4 with the corresponding light-scattering data in Table 3.

The physical reason for the above is that the TiO$_2$-Control pigment, which is badly overcrowded in coating formations when used by itself (100%), becomes first "uncrowded" by way of dilution with calcined clay, its light-scattering efficacy benefiting from the initial dilution. Upon a continuing dilution with calcined clay beyond a certain limit, however, the light-scattering efficacy of the TiO$_2$-Control/Calcined Clay systems begins to fall off. In contrast, the light-scattering efficacy of coating films made 100% of the aggregate-TiO$_2$ pigment samples does not seem to be affected at all by particle crowding; thus, the packing of TiO$_2$-particle aggregates within the latter films can be considered as optimal to begin with. As a consequence, however, the light-scattering efficacy of the latter aggregate-pigment samples falls off at a higher rate upon initial dilution with calcined clay than that of the TiO$_2$-Control sample.

The above-mentioned higher rate of the decay of the light-scattering efficacy with the increasing dilution with calcined clay notwithstanding, the optical-performance efficacy of the aggregate-TiO$_2$ pigments/calcined clay blends (systems) is still substantially higher than that of the equivalent TiO$_2$-Control/calcined clay blends, as shall be demonstrated hereinafter in terms of the respective opacifying efficacies.

The opacifying efficacy of the aggregate-TiO$_2$ pigment samples under discussion, compared with that of the TiO$_2$-Control sample, is illustrated by the data in Table 5. The opacity measurements were carried out using binderless coating films of three different basis weights (g/m$^2$), deposited on clear mylar sheets as coating substrates.

TABLE 5

| SYSTEM | FILM OPACITY AT THE COATING WEIGHT OF: | | |
|---|---|---|---|
| | 5.0 g/m$^2$ | 8.14 g/m$^2$ | 10.0 g/m$^2$ |
| TiO$_2$-Control | 69.0 | 76.7 | 80.4 |
| AGG224-W | 75.7 | 83.6 | 86.3 |
| AGG336-W | 79.4 | 86.8 | 89.3 |
| AGG448-W | 77.4 | 85.6 | 88.6 |
| AGG224-D | 75.8 | 83.3 | 86.2 |
| AGG336-D | 76.2 | 83.4 | 86.4 |
| AGG448-D | 80.6 | 87.0 | 93.2 |

Correspondingly, the data in the following Table 6 illustrate the opacifying efficacy of the aggregate-TiO$_2$ pigment samples listed in Table 5, except that each of these samples, used in a proportion of 40%, by weight, was blended with a loose fine-particle-size calcined clay, used in a proportion of 60%, by weight.

TABLE 6

| SYSTEM | FILM OPACITY AT THE COATING WEIGHT OF: | | |
|---|---|---|---|
| | 5.0 g/m$^2$ | 8.14 g/m$^2$ | 10.0 g/m$^2$ |
| TiO$_2$-Cont./Calc. Clay | 67.8 | 74.1 | 75.9 |
| AGG224-W/Calc. Clay | 73.2 | 81.9 | 84.9 |
| AGG336-W/Calc. Clay | 74.2 | 81.8 | 84.6 |
| AGG448-W/Calc. Clay | n.d. | n.d. | n.d. |
| AGG224-D/Calc. Clay | 72.7 | 81.2 | 84.3 |
| AGG336-D/Calc. Clay | 73.0 | 82.0 | 85.3 |
| AGG448-D/Calc. Clay | 73.0 | 81.2 | 84.4 | n.d.: not determined

The data listed in both of the above tables (Nos. 5 and 6) clearly demonstrate the superior opacifying efficacy of the aggregate-TiO$_2$ pigment samples (both alone or in blends with calcined clay) compared to that of the corresponding TiO$_2$-Control systems. Thus, the opacifying efficacy of the aggregate-TiO$_2$ pigment samples listed in Table 5 is, at a coating weight of 5 g/m$^2$, nearly as high as, or even higher than, that of the TiO$_2$-Control sample at a coating weight of 8.14 g/m$^2$, which amounts to a relative improvement of about 60%. Correspondingly, the opacifying efficacy of the aggregate-TiO$_2$ pigment sample AGG448-D is estimated to be more than twice as high at a coating weight of 10 g/m$^2$ as the opacifying efficacy of the TiO$_2$-Control sample.

The above is understood readily considering that the coating opacity obtained with the TiO$_2$-Control sample increases from 69.0% to 80.4%, i.e., by 11.4 percentage points, when the coating weight is doubled from 5 g/m$^2$ to 10 g/m$^2$. At the same coating weight of 10 g/m$^2$, however, the coating opacity obtained with the aggregate-TiO$_2$ pigment sample AGG448-D is 12.8 percentage points higher than that obtained with the TiO$_2$-Control sample. Since the rate of opacity increase obtained with TiO$_2$-containing systems falls off rapidly with increasing TiO$_2$ concentration, as evidenced by the data in Table 1, the opacity gain expected from a second doubling of the coating weight of the TiO$_2$-Control sample (e.g., from 10 g/m$^2$ to 20 g/m$^2$) will obviously be smaller than the 11.4 percentage points obtained when the coating weight of the latter sample was first doubled (from 5 g/m$^2$ to 10 g/m$^2$).

As indicated by the data in Table 6, the superior opacifying efficacy of the aggregate-TiO$_2$ pigment samples, relative to that of the TiO$_2$-Control sample, was sustained also when all the above pigment samples were blended with 60%, by weight, of a loose fine-particle-size calcined clay. Thus, the opacifying efficacy of the aggregate-TiO$_2$/Calcined Clay systems used at a coating weight of 5 g/m$^2$ was nearly, or fully, equal to the opacifying efficacy of the TiO$_2$-Control/Calcined Clay system used at a coating weight of 8.14 g/m$^2$, which constitutes a relative improvement of about 60%. Correspondingly, an incremental opacity increase of only 8.1 percentage points was obtained with the TiO$_2$-Control/Calcined Clay system when the coating weight was doubled from 5 g/m$^2$ to 10 g/m$^2$, whereas the opacity obtained with the AGG336-D/Calcined Clay system at the coating weight of 10 g/m$^2$ was already 9.4 percentage points higher than the opacity of the TiO$_2$-Control/Calcined Clay system at the same coating weight. It is thus estimated that the coating weight of the TiO$_2$-Control/Calcined Clay system would have to more than doubled (from 10 g/m$^2$ to 25 or even 30 g/m$^2$) to obtain an opacity increment of 9.4 percentage points, equalling the opacity of the AGG336-D/Calcined Clay system at 10 g/m$^2$.

As is readily understood by those skilled in the art, the opacifying-efficacy advantage the above aggregate-TiO$_2$ pigment samples have over straight (loose) TiO$_2$ pigments will grow even higher with increasing coating weights.

A pigment-lattice expansion of the aggregate-TiO$_2$ pigment products of the present invention can also be obtained with the aid of other materials, used in addition to the calcium-silico-aluminate or similar complex microgel, as demonstrated by the example to follow.

EXAMPLE III

An aggregate-TiO$_2$ pigment sample was synthesized in both the "wet" and "dry" versions using the procedures described in Example II. The raw materials were used in proportions of 100 g futile pigment, 2 g acrylic-polyvinylacetate latex of the type commonly used in the paper industry and, in terms of the complex-microgel-forming reagents, 2 g sodium silicate, 2 g sodium aluminate and 4 g calcium chloride, all above weights referring to materials on an active basis.

The above-prepared aggregate-TiO$_2$ pigment samples, designated "AGG224L-W" and "AGG224L-D" (the symbol L standing for Latex) were made down into 50%-solids slurries in the manner described in Example II.

Selected particle-size-distribution data for the aggregate-TiO$_2$ pigment samples from Example III, listed in the following Table 7, indicate a particularly high degree of agglomeration of the latex-containing sample.

AGG224L-D, in general, and its fine fraction (<0.3 μm), in particular.

TABLE 7

| PARTICLE SIZE: | AGG224L-W | AGG224L-D |
|---|---|---|
| % finer than 2 μm | 98.8 | 83.0 |
| % finer than 1 μm | 97.5 | 59.7 |
| % finer than 0.3 μm | 30.7 | 3.4 |
| 100% finer than [μm] | 10.0 | 15.0 |

The optical data obtained with coating films laid down from 50%-solids slurries of AGG224L-W, AGG224L-D and TiO$_2$-Control on black glass plates and clear mylar sheets, as coating substrates, are listed in Table 8.

TABLE 8

| DETERMINATION | TiO$_2$-CONTROL | AGG224L-W | AGG224L-D |
|---|---|---|---|
| BGP$^a$-"AS IS" (at 4 g/m$^2$) | | | |
| S$_{457}$ [m$^2$/g] | 0.43 | 0.55 | 0.65 |
| S$_{577}$ [m$^2$/g] | 0.31 | 0.43 | 0.51 |
| Rho [%] | 72.1 | 78.2 | 78.5 |
| BGP$^a$-40% AGG. SAMPLE/60% CALC. CLAY (at 4 g/m$^2$) | | | |
| S$_{457}$ [m$^2$/g] | 0.38 | 0.48 | 0.52 |
| S$_{577}$ [m$^2$/g] | 0.29 | 0.40 | 0.45 |
| Rho [%] | 76.3 | 83.3 | 86.5 |
| MYLAR-"AS IS" | | | |
| Opacity at 5.0 g/m$^2$ | 69.0 | 75.7 | 78.2 |
| Opacity at 8.14 g/m$^2$ | 76.7 | 84.5 | 88.0 |
| Opacity at 10.0 g/m$^2$ | 80.4 | 87.6 | 90.8 |
| MYLAR-40 AGG. SAMPLE/60 CALC. CLAY | | | |
| Opacity at 5.0 g/m$^2$ | 67.8 | 72.1 | 71.9 |
| Opacity at 8.14 g/m$^2$ | 74.1 | 81.9 | 82.5 |
| Opacity at 10.0 g/m$^2$ | 75.9 | 85.4 | 86.3 |

$^a$Black Glass Plates

Since the relative density of latex employed in synthesizing the aggregate-TiO$_2$ pigments AGG224L-D and -W is equal to 1 g/cm$^3$, its specific volume being equal to 1 cm$^3$/g, the combined contribution of both the latex and microgel cement to the pigment-lattice expansion amounts to 14.4%, by volume, for AGG224L-D and 14.7%, by volume, for AGG224L-W. The latter pigment-lattice expansions are lower by only 0.1 and 0.4 percentage point, respectively, than the analogous lattice expansions of 14.5% and 15.1%, by volume, obtained with the aggregate-TiO$_2$ pigment samples AGG448-D and -W containing twice as much of the microgel cement as the aggregate-TiO$_2$ pigment products of the generic type AGG224. The light-scattering coefficients and the opacifying efficacy of pigment samples AGG224L-D and -W are higher than those of the analogous aggregate-TiO$_2$ pigment samples containing no latex, i.e., AGG224-D and -W, and almost as high as those of the aggregate-TiO$_2$ pigment samples AGG448-D and -W having a slightly higher pigment-lattice expansion.

The aggregate-TiO$_2$ pigment products of the present invention, having an expanded pigment lattice, also encompass ultrahigh-opacifying aggregate pigment products synthesized in accordance with the example to follow.

EXAMPLE IV

An aggregate-TiO$_2$ pigment sample was synthesized using the procedure described in Example II. The raw materials were used in proportions of 100 g commercial futile pigment; 120 mg carbon black dispersed in 11.88 g of a precipitated metal silicate ("carbon-black masterbatch"); 2 g ultrafine acrylic polymer-emulsion adhesive with an average particle diameter smaller than 50 nm; 5 mg violet dye; 2 mg blue dye; and, in terms of the complex microgel-forming reagents, 4 g sodium silicate, 4 g sodium aluminate and 8 g calcium chloride, all above weights referring to materials on an active basis.

The flocculated slurry was filtered, rinsed, dried and pulverized, yielding a pigment with a brightness of 72.2%, further designated as AGGHO (HO standing for "High Opacifying"). The latter sample contained 89.3 parts, by weight, of TiO$_2$ in 100 parts, by weight of the pigmentary and subpigmentary raw materials (80.6%, by weight, of the aggregate-pigment mass). The resultant aggregate-TiO$_2$ pigment-lattice expansion in sample AGGHO, containing 12 g carbon black masterbatch (consisting of 0.12 g carbon black and 11.88 g precipitated metal silicate deagglomerated to subpigmentary dimensions), 2 g latex and 10.1 g complex microgel cement, active basis, per 100 g of TiO$_2$, was calculated to be 31.3%, by volume. Because of high thixotropy, an aqueous slurry of the above pigment sample was prepared at a solids level of only 41%, by weight, using the same proportions and types of dispersants as employed in Example II.

The optical data obtained with coating films deposited from 41%-solids slurries of the aggregate-TiO$_2$ pigment sample AGGHO and TiO$_2$-Control on black glass plates and on clear mylar sheets as coating substrates are listed in Table 9.

TABLE 9

| DETERMINATION | TiO$_2$-CONTROL | AGGHO |
|---|---|---|
| BGP$^a$-"AS IS" (at 4 g/m$^2$) | | |
| S$_{457}$ [m$^2$/g] | 0.43 | 0.52 |
| S$_{577}$ [m$^2$/g] | 0.31 | 0.40 |
| Rho [%] | 72.1 | 76.9 |
| MYLAR-"AS IS" | | |
| Opacity %, at 5.0 g/m$^2$ | 69.0 | 92.1 |
| Opacity %, at 8.14 g/m$^2$ | 76.7 | 99.5 |
| Opacity %, at 10.0 g/m$^2$ | 80.4 | 99.6 |

$^a$Black Glass Plates

As shown by the data in the above table, the opacifying efficacy of the aggregate-pigment sample AGGHO is extremely high. For example, the opacity of 92.1%, obtained with the latter pigment sample on a mylar sheet at a coating weight of 5 g/m$^2$, could be obtained under the same conditions of testing only when the TiO$_2$-Control sample was employed at a sixfold higher coating weight, i.e., 30 g/m$^2$. To reach a coating opacity of 99.6%, obtained above with the aggregate-pigment sample AGGHO at a coating weight of 10 g/m$^2$, the TiO$_2$-Control sample had to be used at a fifteen times higher coating weight, corresponding to more than 150 g/m$^2$.

The applicability of the above aggregate-pigment sample AGGHO to newsprint filling was tested in accordance with the example to follow.

EXAMPLE V

Newsprint handsheets with a basis weight of 30 lbs. per 3000 ft$^2$, prepared with the aid of standard laboratory procedures used in the paper industry, were loaded to two different filler levels using the aggregate-TiO$_2$ pigment sample AGGHO in one handsheet series and TiO$_2$-Control in the other. The pH of the newsprint furnish was maintained at a level of 4.5, the wet-end chemicals employed being alum, in a proportion of 40 lbs. per ton of furnish, and Accurac 181 (a polymeric retention aid), in a proportion of 0.5 lbs. per ton of furnish. The corresponding unfilled reference handsheets had a printing opacity of about 92% and brightness of 54%.

The optical data pertaining to the printing opacity and brightness of the filled handsheets from Example V are shown in Table 10.

TABLE 10

| SYSTEM | FILLER LEVEL, % BY WEIGHT | OPACITY, % | BRIGHTNESS, % |
|---|---|---|---|
| TiO$_2$-Control | 1.81 | 94.7 | 59.5 |
| AGGHO | 1.84 | 95.6 | 56.6 |
| TiO$_2$-Control | 3.70 | 95.6 | 62.7 |
| AGGHO | 3.62 | 97.4 | 57.8 |

As is evident from the data in the above table, the printing opacity provided by the aggregate-TiO$_2$ pigment sample AGGHO employed at the filler-loading level of 1.84%, by weight, is the same as that provided by the TiO$_2$-Control sample employed at the twice higher filler-loading level of 3.70%. Since the printing opacity of newsprint handsheets containing the TiO$_2$-Control increased by a mere 0.9 percentage point (from 94.7% to 95.6%) when the filler-loading level was doubled from 1.81% to 3.70%, by weight, it can be anticipated that the printing opacity of 97.4% obtained with newsprint handsheets containing 3.64%, by weight, of the aggregate-TiO$_2$ pigment sample AGGHO could not likely be obtained with straight TiO$_2$ unless the latter were employed at a filler-loading level significantly exceeding 10–12%, by weight. As is also understood from the preceding discussion, the opacifying advantage attainable with the aggregate-TiO$_2$ pigment sample AGGHO relative to straight TiO$_2$ increases drastically with the increasing pigment concentration in the end-use formation.

It should be pointed out, of course, that straight TiO$_2$ (TiO$_2$-Control) provides a higher sheet-brightness improvement than the aggregate-TiO$_2$ pigment sample AGGHO used above. One should consider, however, that the brightness of commercial newsprint ranges from 58% to 62% and that the cost of pulp bleaching needed to gain 1 percentage point of brightness of newsprint pulp is presently equal to the cost of about one pound of TiO$_2$ pigment. Hence, using the aggregate-TiO$_2$ pigment sample AGGHO exemplarily at a filler-loading level of 2%, by weight, the total cost of making up the deficit of 3 percentage points of sheet brightness relative to that obtained with the TiO$_2$-Control would be cost-wise equivalent to a TiO$_2$ filler-loading increment of a mere 0.15%, by weight, which is obviously quite insignificant in terms of the opacifying effects to be gained.

As is readily understood by those skilled in the art, aggregate pigments of the above-discussed ultrahigh-opacifying type are ideally suited for the manufacture of nonsagging, thixotropic, waterborne color paints, or even off-white paints, capable of providing, at a great economy, a total hiding of even a completely black background using a single-coat application. With analogous paints of the prior art, a substantial share of the hiding job is borne by the color pigments, which are far more expensive than TiO$_2$.

Another attractive feature of the ultrahigh-opacifying aggregate-TiO$_2$ pigment products of the present invention, having highly-disperse carbon black incorporated into their structure, is their outstanding hiding power in plastics, synthetic fibers, and solvent-based paints and lacquers, an additional benefit being derived from the carbon black's antioxidant properties. The antioxidant properties of the aggregate-TiO$_2$ pigment products in question can be still more enhanced by additionally incorporating ultrafine futile, comminuted to a particle diameter essentially 100%, by weight, finer than 0.2 μm, or even 0.1 μm, into the aggregate-TiO$_2$ pigment products.

Carbon black is well known for its outstanding opacifying properties, which are acknowledged in the industry to be from 100 to 150 times higher than those of TiO$_2$ pigments of the prior art. The opacifying efficacy of carbon black can be further increased, to a level 2000–5000 times higher than that of TiO$_2$ pigments, by deagglomeration with the aid of the "masterbatch" technique (disclosed in the previously mentioned U.S. Pat. No. 5,116,418 to Kaliski) and incorporation into the aggregate-TiO$_2$ pigment products of the present invention.

Since the release of even traces of loose carbon black (e.g., at levels amounting to only a couple of parts per billion) would be intolerable in most industrial applications dealing with white papers, or similar materials, the carbon black must be irreversibly immobilized within the aggregate-pigment structure. The immobilization of the extremely hydrophobic carbon black particles within the pronouncedly polar aggregate-TiO$_2$ pigment products of the present invention can be attained by incorporating up to 2–3 parts, by weight, of suitable organic polymer adhesives of a water-disperse and/or water-soluble type into the starting pigment furnish. When calcium-silico-aluminate or similar complex microgels are used as the TiO$_2$-aggregating system, the immobilization of carbon black particles can also be facilitated by incorporating organic, cationic polyelectrolytes directly into the solutions of the bivalent and/or multivalent inorganic cross-linking salts.

Aggregate-TiO$_2$ pigment products containing as little as 0.005 parts, by weight, of carbon black are already essentially devoid of the yellow undertones inherent to all commercial TiO$_2$ pigments, while a markedly improved opacifying efficacy is obtained already at an analogous carbon black content of only 0.01 parts, by weight. The opacifying efficacy of the aggregate-TiO$_2$ pigment products under discussion can be yet more enhanced by using black dyes, such as nigrosine, along with the carbon black. As is indicated by the present experience, the maximum useful carbon black content in the above aggregate-TiO$_2$ pigment products is equal to about 0.25 parts, by weight.

Another important advantage offered by the aggregate-TiO$_2$ pigment products of the present invention is that they can be rendered completely color neutral with just a couple of one-thousandths of one part, by weight, of corrective dyes (usually a combination of blue and red ones) eliminating the undesirable yellow undertone associated with commercial TiO$_2$ pigments. The corrective dyes of a pigmentary (particulate) type are simply coflocculated with other particulate raw materials present in the furnish, whereas water-soluble, ionically active (cationic or anionic) dyes are built chemically into the macromolecules making up the complex functional microgel cements.

Using appropriately higher levels of color dyes in the starting furnish, it is possible to synthesize aggregate-TiO$_2$ pigment products that are suitable for a direct, convenient and economical coloring of paper, nonwovens, paints, plastics or synthetic fibers without incurring a separation of pigments and (loose) dyes, such as are unavoidable in analogous applications carried out in accordance with the prior art. It should be pointed out, though, that the adhesive content of the aggregate-$TiO_2$ pigment products in question must be increased accordingly, preferably using latex or polyvinyl alcohol, since high levels of organic dyes employed weaken the mechanical strength of the microgel cement. According to the present indications, the useful content of the organic dyes in the aggregate-$TiO_2$ pigment products under discussion is limited to about 5 parts, by weight.

White aggregate-$TiO_2$ pigment products of the present invention are also suited, of course, for any and all applications in which $TiO_2$ pigments of the prior art are currently employed, providing much better optical and functional performance and economy of use than the latter. One application area deserving special emphasis is the manufacture of high-gloss enamel paints and lacquers using the above aggregate-$TiO_2$ pigment products made of extra-fine $TiO_2$ particulates, defined herein as being essentially 100%, by weight, finer than from 0.3 to 0.9 $\mu$m in diameter. Aggregate-$TiO_2$ pigment products synthesized from yet finer $TiO_2$ particulates, i.e., the ultrafine ones, defined herein as being essentially 100%, by weight, finer than 0.1-0.2 $\mu$m, in diameter, are uniquely suited for use as fillers for synthetic fibers and plastics. In the latter application, the aggregate-$TiO_2$ pigment products made from the above ultrafine particulates combine both their excellent antioxidant properties with an outstanding optical-performance efficacy.

While $TiO_2$ pigments are hydrophilic by nature, thus more or less difficult to use as fillers for plastics or synthetic fibers, arbitrary levels of organophilic properties can be imparted to the aggregate-$TiO_2$ pigment products of the present invention during their synthesis. The organophilic properties in question are obtained with the aid of functional organic, cationically active compounds with at least two reactive groups in each molecule, added to the solutions of the inorganic cross-linking salts used for the in-situ synthesis of the complex microgel cements employed in the preferred mode of manufacturing the aggregate-$TiO_2$ pigment products under discussion.

The organic, cationically active chemical compounds of the above-mentioned type, capable of participating (along with the inorganic salts) in the cross-linking of transient, chemically reactive subcolloidal sodium-silico-aluminate and similar hydrosols, are too numerous to list. The latter compounds can be selected most readily, however, from three well-defined generic groups of chemical compounds, namely, cationic surface active agents, e.g., Hyamine 2389 (methyldodecyl-benzyl-trimethyl ammonium chloride-methyl-dodecylxylene bis[trimethyl ammonium chloride]); Werner complexes, e.g., Quilon M (a colorless bivalent organo-metallic complex in which a fatty acid is coordinated with aluminum); and cationic polyelectrolytes, such as polyacrylamides. These functional organic compounds should be added sparingly to solutions of the inorganic cross-linking salts employed, only to the extent needed to impart the desired levels of surface-chemical modification to the in-situ-synthesized, hybrid, inorganic/organic (predominantly inorganic) complex functional microgels, thus indirectly also to the resultant aggregate-$TiO_2$ pigment products. It is important, however, to monitor the cementing efficacy of the evolving hybrid, complex microgel cements in that the cement strength deteriorates markedly with the increasing content of the organic, cationic materials mentioned above.

The organic, cationically active chemical compounds with at least two reactive groups in each molecule can best be screened with the aid of specialized empirical methods, such as contact angle determinations. The latter determinations make it possible to assess which, and how much, of these compounds should be built into the aggregate-$TiO_2$ pigment products to modify their surface-chemical properties to the extent needed to render them compatible with an arbitrary organic medium. According to the present findings, a perceptible modification of the surface-chemical properties of the aggregate pigment products can already be obtained when the organic, cationically active compounds in question are used in proportions even as low as 0.001-0,005 parts, by weight, the highest useful proportion of these compounds being correspondingly about 0.5 parts, by weight.

In essence, therefore, the two principal factors responsible for the superior optical performance of the aggregate-$TiO_2$ pigment products of the present invention, compared with that of unadulterated (nonaggregated) $TiO_2$ pigments of the prior art, are the in-situ aggregation of $TiO_2$-pigment fines and the statistical-pigment-lattice expansion within $TiO_2$-particle aggregates. The particle (aggregate)-size distribution of the resultant aggregate-pigment products is not considered a principal factor in that the need for particle-size optimization has always been obvious and applies universally to all pigments, regardless of type.

The enormous flocculating and cementing potency of the in-situ-synthesized complex microgels being considered, the task of aggregating $TiO_2$ particles is performed adequately regardless of the dose of the microgel cements employed, within the limits of the microgel-dosage specifications claimed herein, of course. Hence, the principal variable to be optimized in the design of the aggregate-$TiO_2$ pigment products of the present invention, beyond and above the beneficial effects of the in-situ aggregation of pigment fines alone, is the aggregate-pigment-lattice expansion. It is thus clear that the calcium-silico-aluminate and similar microgel cements employed at levels exceeding the "2-2-4" level (2-2-4 indicating the number of grams, dry weight, of sodium silicate, sodium aluminate and calcium chloride, respectively, per 100 g of pigmentary raw material), such as is preferred for the beneficial in-situ aggregation of pigment fines, are intended primarily as a convenient medium for a controlled pigment-lattice expansion.

With the generic series of aggregate-$TiO_2$ pigment samples synthesized in Example II by both the dry (D) and wet (W) methods, i.e., AGG224, AGG336, and AGG448 containing 5.0 g, 7.6 g, and 10.1 g of the microgel cement (dry mass), respectively, per 100 g of $TiO_2$ raw material, the pigment-lattice expansions are, correspondingly, 7.8-8.2%, 11.3-11.8%, and 14.5-15.1%, by volume, the lower value in each of the above pairs of numbers indicating the pigment-lattice expansion of sample prepared by the dry (D) method. With the analogous generic samples AGG 5-5-10 and AGG 6-6-12 containing 12.6 g and 15.1 g of microgel cement, respectively, per 100 g of $TiO_2$ raw material, the corresponding pigment-lattice expansions are 17.5-18.2%, and 20.2-21.1%, by volume.

The already considerable manufacturing difficulties encountered with the above-mentioned aggregate-$TiO_2$ pigment products AGG 5-5-10 and AGG 6-6-12, increase enormously with a yet further increase of the complex microgel content in the aggregate-$TiO_2$ pigment products under discussion. Hence, the manufacture of aggregate-$TiO_2$ pigment products corresponding to the generic formula AGG 8-8-16, synthesized using 8 g sodium silicate, 8 g sodium aluminate and 16 g calcium chloride (active basis) per 100 g of $TiO_2$ raw material, presents a formidable technical effort. The resultant complex microgel content (at a yield of about 63% in relation to the dry mass of the microgel-forming reagents employed) amounts to 20.2 g, dry weight, per 100 g of pigmentary $TiO_2$ (the use of subpigmentary raw materials becomes progressively more impractical at very high microgel-content levels), the resultant pigment-lattice expansion being equal to 25.3–26.2%, by volume.

As indicated by the present experience, the use of complex microgel cements at levels exceeding that in the above-discussed AGG 8-8-16 is not feasible for all practical purposes. Accordingly, it can be calculated from the above generic formula that the maximum proportion of the chemically reactive, subcolloidal sodium-silico-aluminate or similar hydrosols (i.e., 10:1 relative to the bivalent and/or multivalent inorganic cross-linking salts) tolerable in the system (furnish) is equal to about 29 parts, by weight, active basis, for each 100 parts, by weight, of pigmentary and/or subpigmentary raw materials. The complementary proportion of the bivalent and/or multivalent inorganic cross-linking salts (i.e., 1:10) is, correspondingly, about 2.9 parts, by weight, active basis, and, vice-versa, 29 parts, by weight, inorganic cross-linking salts versus 2.9 parts, by weight, subcolloidal hydrosols. However, the most preferred proportions (i.e. 1:1), as previously indicated, are, in the above-discussed case, 16 parts, by weight, active basis, subcolloidal hydrosol and 16 parts, by weight, active basis, inorganic cross-linking salts, per 100 parts, by weight, of pigmentary and/or subpigmentary raw materials.

Aggregate-$TiO_2$ pigment-lattice expansion in excess 25–26%, by volume, can be readily obtained by other means, e.g., using, along with the complex microgel cements, extraneous organic cements/adhesives which, by virtue of their physical presence, automatically contribute to the pigment-lattice expansion. Overall, however, the combined content of both the inorganic and organic cements/adhesives in the aggregate-$TiO_2$ pigment products of the present invention should not exceed 23%, by weight (30 parts, by weight, for each 100 parts, by weight, of $TiO_2$ and other pigmentary and/or subpigmentary raw materials).

Individually, the proportion of the in-situ-synthesized (inorganic or hybrid, predominantly inorganic) complex microgel cements should not exceed 20 parts, by weight, in relation to 100 parts, by weight, of $TiO_2$ and other pigmentary and/or subpigmentary raw materials, while the proportion of one or more organic cements/adhesives, used in combination with said in-situ-synthesized complex microgel cements, should not exceed 10 parts, by weight, in relation to 100 parts, by weight, of said $TiO_2$ and other pigmentary and/or subpigmentary raw materials.

The preferred organic cements/adhesives, for both the manufacture of, and lattice expansion in, the aggregate-$TiO_2$ pigment products under discussion are the novel, ultrafine acrylic polymer-emulsion adhesives, having particles smaller than 55 nm in diameter and glass-transition temperature of from −60° C. to +20° C., disclosed in the co-pending patent application Ser. No. 07/333,435 ("Ultrafine Polymer-Emulsion Adhesives for Microadhesion"), Filed Apr. 4, 1989 now abandoned, incorporated herein by reference. Most preferred cements/adhesives as well as pigment-lattice-expanding media are also the novel, waterborne acrylic rubber cements obtained by underpolymerizing the above-mentioned ultrafine polymer emulsions. Other media suitable for pigment-lattice expansion are water-soluble adhesives, such as polyvinyl alcohol or starch, and conventional latexes with the smallest possible particle diameters. Both of the above types of cements/adhesives can be employed in proportions of up to 10 parts, dry weight, for each 100 parts, by weight, of $TiO_2$ and other pigmentary and/or subpigmentary raw materials, regardless of whether employed alone or in combination with the in-situ-synthesized inorganic or hybrid, predominantly inorganic cements.

The optimization of the statistical pigment-lattice expansion of the aggregate-$TiO_2$ pigment products of the present invention, intended for maximizing these products' optical-performance efficacy, can be carried out quantitatively by varying the level of pigment-lattice expansion using the same expanding medium, or qualitatively, by using more than one lattice-expanding medium. For example, aggregate-$TiO_2$ pigment products containing 10 parts, by weight, of dry microgel cement for each 100 parts, by weight, of $TiO_2$ have a pigment-lattice expansion of about 14.5%, by volume, and a pronouncedly polar character. Analogous products additionally containing 5 parts, by weight, of an acrylic latex (with a relative density of 1.0 g/cm$^3$), for each 100 parts, by weight, of $TiO_2$ have a combined pigment-lattice expansion of 27.4%, by volume, while the resultant steric matrix of discrete organophilic sites built into the aggregate structure renders these products simultaneously nonpolar (from latex particles) and polar (from both the microgel-cement residues and $TiO_2$ itself). The combined use of both of the above-mentioned, polar and nonpolar pigment-lattice expanding media, therefore, makes it possible to attain any practically useful or desirable level of pigment-lattice expansion, while, at the same time, modifying at will the surface-chemical properties of the resultant aggregate-$TiO_2$ pigment products under discussion.

As has already been pointed out, still higher pigment-lattice expansion of the aggregate-$TiO_2$ pigments of the present invention can be obtained with the aid of subpigmentary in-situ synthesized and/or extraneous, mechanically deagglomerated/comminuted, mineral particulates. Subpigmentary mineral particulates, such as alumino-silicates, hydrated alumina, hydrated silica, calcium silicate, calcium sulfate, barium sulfate, calcium carbonate, lithium carbonate, calcium hydroxide and magnesium hydroxide, can be synthesized directly (in situ) in the $TiO_2$ furnish. It is necessary, however, to ensure that (a) the system (furnish) is aged for a sufficiently long period to render the precipitated subpigmentary particulates chemically nonreactive; and (b) there are no free (unreacted) chemicals left in the furnish from the in-situ synthesis of subpigmentary particulates before the subcolloidal-hydrosol-forming reagents (i.e., sodium silicate and sodium aluminate) are introduced into the $TiO_2$ furnish containing the in-situ-synthesized subpigmentary particulates in question.

Extraneously prepared subpigmentary mineral particulates, employed as pigment-lattice-expanding media, can be incorporated directly (in the form of aqueous dispersions) into the furnishes of pigmentary and/or other subpigmentary raw materials. While discrete (nonaggregated) subpigmentary mineral particulates have never been available commercially, it is possible to transiently generate such materials by an intensive mechanical deagglomeration and/or comminution of commercial precipitated metal (calcium or aluminum) silicates. The latter silicates are synthesized in the form of "elementary" particles with equivalent spherical diameters ranging from about 0.01 to 0.03 μm, but agglomerate spontaneously and rapidly into clusters with equivalent spherical diameters of up to 10 μm.

A practical application of the above-mentioned deagglomeration approach was demonstrated in Example IV in which the aggregate-$TiO_2$ pigment sample AGGHO, containing 11.88 g mechanically deagglomerated subpigmentary precipitated metal silicate (from the carbon black masterbatch), 2 g latex and 10.1 g calcium-silico-aluminate microgel cement per 100 g of a commercial $TiO_2$ pigment, had a resultant aggregate-pigment-lattice expansion of 31.2%, by volume. The masterbatch in question was prepared by deagglomerating a high-solids paste of Hydrex (a precipitated pigmentary metal silicate manufactured by Huber Corp.) with the aid of ultrahigh-shear kneading and compounding the latter paste with a commercial aqueous dispersion of carbon black.

Having no cementing properties of their own, the above-mentioned subpigmentary mineral particulates must be used in connection with appropriate cements/adhesives, such as the in-situ-synthesized complex microgel cements, water-disperse cements/adhesives or water-soluble cements/adhesives. It should be pointed out in the above context, however, that employing high levels of either of the above-discussed types (i.e., in-situ-synthesized or extraneous) of subpigmentary mineral particulates is associated with considerable manufacturing difficulties, caused by an excessive thickening of the reaction medium (pigment furnish). It is thus necessary from a practical standpoint to limit the maximum content of the in-situ-synthesized, or extraneous, subpigmentary mineral particulates in the aggregate-$TiO_2$ pigment products under discussion to 25 parts, by weight.

It should further be pointed out that aggregate-$TiO_2$ pigment products containing large proportions of subpigmentary mineral particulates are extremely thixotropic and cannot be made down into high-solids slurries. As a matter of fact, the maximum practical solids content of slurries of some aggregate-$TiO_2$ pigment products (containing high proportions of subpigmentary mineral particulates) may be lower than 20%, by weight. As is readily understood by those skilled in the art, such extremely thixotropic pigment slurries are uniquely suited for certain practical applications but are also unsuitable for many others.

It is worth emphasizing that subpigmentary and nonpigmentary pigment-lattice-expanding media have virtually no optical efficacy of practical significance in their own right. The sole practical contribution of these media to the improved optical performance of the aggregate-$TiO_2$ pigment products under discussion is derived from mechanically wedging apart the individual $TiO_2$ particles within pigment aggregates. As a matter of fact, some of the pigment-lattice-expanding media, such as water-soluble or water-disperse polymers, are nearly completely transparent.

The mechanism of the enhancement of light scattering brought about by pigment-lattice expansion in $TiO_2$-particle aggregates may be explained with the aid of the following intuitive model:

Let us visualize, for example, a light-scattering surface in the form of a chessboard, the diameter of the squares being equal to approximately one-half of an arbitrary wavelength of light. Let us also assume that the white squares are capable of scattering light while the black (empty) squares are "invisible" to the impinging light waves. Obviously, then, only one half of the chessboard is capable of light scattering. By carving (still finer) minichessboards out of each white square of the original board and inserting them into the black squares, the entire chessboard becomes optically active in a modified fashion, in that the impinging light waves cannot "see" that the white minisquares are interspersed with (invisible) black minisquares. The light diffraction will thus occur in infinitely many configurations, with the dimensions of the light-scattering obstacles (combinations of white and black minisquares) ranging from significantly less to significantly more than one half of one wavelength of the impinging light.

The above minisquare chessboard is meant, of course, to represent the mosaic surface of the aggregate-$TiO_2$ pigment products of the present invention. The white minisquares in the above model represent $TiO_2$ particles separated by black minisquares, which, in turn, represent the layers of low-refractive-index pigment-lattice-expanding media wedged between the individual pigmentary and/or subpigmentary $TiO_2$ particles. The purely pragmatic-didactic character of the above simplified, intuitive two-dimensional model notwithstanding, a model applicable to a more fitting interpretation of the enhancement of the light-scattering efficacy of aggregate-$TiO_2$ pigment products through a controlled (optimized) pigment-lattice expansion has not been offered heretofore by anybody else, to the best of the applicant's knowledge.

As is readily understood by those skilled in the art, the increased optical-performance efficacy of the aggregate-$TiO_2$ pigment products of the present invention can be converted directly into a price advantage by employing up to 45 parts, by weight, of conventional (prior-art) extender pigments. Among such viable extenders are, for example, fine-particle-size calcined clays, preferably those with particles essentially 100%, by weight, finer than 2 μm e.s.d.; precipitated metal silicates, hydrated alumina, calcium carbonate and calcium sulfate; as well as non-film-forming (i.e., nonfusing at an ambient or moderately elevated temperature) polyacrylic and polystyrene spherical particulates ("plastic pigments") with particle diameters of from 0.15 μm to 0.5 μm.

It should be strongly emphasized, however, that the above-mentioned conventional extender pigments (incorporated into the aggregate-$TiO_2$ pigment products under discussion) are inherently incapable of expanding the pigment lattice of $TiO_2$-particle aggregates, their role being essentially restricted to that of simple diluents. As a matter of fact, all extender pigments known in the prior art interfere physically with the pigment-lattice-expanding action of the in-situ-synthesized microgel cements and other in-situ-synthesized and/or extraneous pigment-lattice-expanding media, although the extent of this interference varies with different extenders. It is thus important to bear in mind that the incorporation of low-refractive-index pigmentary extenders (diluents) into the above aggregate-TiO$_2$ pigment products merely serves the purpose of increasing the economy of use, but otherwise invariably detracts from the latter aggregate-pigment products' optical-performance efficacy.

The optimum content of the extenders/diluents in question must be assessed empirically for each individual extender material and end-use application to attain the most favorable performance-per-cost parameters. An objectively positive side effect of using the above extenders/diluents, particularly those containing a substantial proportion of pigment fines, is that they can acquire, in many instances, a higher optical-performance efficacy in the aggregated state (due to the beneficial in-situ aggregation of pigment fines) than they had originally in the state "as is."

As is also understood by those skilled in the art, the principal optically active constituent of the aggregate-TiO$_2$ pigment products of the present invention is the particulate TiO$_2$ itself, used in proportions of at least 50, preferably more than 77, parts, by weight, in each 100 parts, by weight, of the aggregate-TiO$_2$ pigment products under discussion, the particulate TiO$_2$ being intrinsically aggregated and cemented into pigmentary formations (aggregates) whose steric lattice is expanded (stretched apart) by the subpigmentary and/or ultrafine nonpigmentary pigment-lattice-expanding media. It is thus irrelevant in the above context which particular processes or auxiliary materials are used to synthesize the aggregate-TiO$_2$ pigment products of the present invention. As a consequence, the latter aggregate-TiO$_2$ pigment products can be manufactured using many different processing approaches and reagents (e.g., cements/adhesives, surface-chemical modifiers, or flocculants), in addition to or instead of those employed in the applicant's preferred approach based on the use of the in-situ-synthesized calcium-silico-aluminate or similar (inorganic or hybrid, predominantly inorganic) complex microgel cements.

It should be strongly reiterated, in the above context, that all pigments, without exception, behave in the same nonunique way as far as their dispersion, aggregation, flocculation, or other aspects of pigments' physical or colloid-chemical behavior is concerned. As a consequence, any and all methods and approaches pertaining to dispersing, aggregating, flocculating, or other aspects of physical or colloid-chemical behavior of pigments in general, already proven in the prior art in application to other (fundamentally different) pigment-upgrading approaches, are also applicable in the very principle to the manufacture of the aggregate-TiO$_2$ pigment products of the present invention.

For example, some of the viable processing approaches referred to above were already employed and tested in the prior art in application to the manufacture of various composite pigments of the extended-ZnS or extended-TiO$_2$ types, as well as to the manufacture of low-refractive-index "bulking" pigments, which are fundamentally different from the aggregate-TiO$_2$ pigment products of the present invention. It should be pointed out, however, that the general processing approaches known in the prior art virtually always require a more or less extensive modification to make them more amenable to practicing the present invention.

Processing approaches capable of providing a fairly rapid (though not instantaneous) immobilization of particulate ingredients of pigment furnishes used for the synthesis of the aggregate-TiO$_2$ pigment products of the present invention are based on the use of spray drying and freeze drying, as suggested by Fadner in U.S. Pat. No. 3,453,131 for making certain types of composite pigments. While the above-mentioned approaches provide neither a permanent aggregation of the particulates, nor a pigment-lattice expansion, both permanent aggregation and lattice expansion can be obtained by additionally incorporating into the furnishes of TiO$_2$ and other pigmentary and/or subpigmentary raw materials at least one of the following cements/adhesives:

(a) in-situ-synthesized, predominantly inorganic or predominantly organic complexes obtained by a reaction between organic, cationic polyelectrolytes, e.g., polyacrylamides, and inorganic, anionic dispersants, e.g., alkali-metal phosphates or alkali-metal silicates;

(b) organic cements curable by chemical processes, e.g., epoxy cements;

(c) chemically nonreactive polymer-emulsion adhesives, e.g., acrylic, styrene-butadiene or polyvinyacetate latexes, and/or water-soluble polymer adhesives, e.g., polyvinyl alcohol or carboxymethyl cellulose;

(d) chemically reactive water-disperse and/or water-soluble polymer adhesives, e.g., having chemically reactive groups in their macromolecular structure, cross-linkable by gaseous acids or bases;

(e) water-disperse and/or water-soluble polymer adhesives curable by thermal or radiant energy; and (f) ultrafine dispersions of particulate thermoplastic adhesives in liquids (preferably water) having particles essentially 100%, by weight, finer than 0.1–0.2 μm in diameter (chemically similar to the considerably coatset dry-powder adhesives employed, under electrostatic assist, in the manufacture of dry-formed nonwoven);

The cements/adhesives specified from (a) through (e) can be employed in proportions of up to 10 parts, by weight, active basis, for each 100 parts, by weight, of pigmentary and/or subpigmentary raw materials. The cements/adhesives specified in (f) can be employed correspondingly in proportions of up to 15 parts, by weight, active basis, for each 100 parts, by weight, of TiO$_2$ and other pigmentary and/or subpigmentary raw materials.

An additional pigment-lattice expansion of aggregate-TiO$_2$ pigment products under discussion can be obtained by incorporating up to 25 parts, by weight, in-situ-synthesized or extraneous (mechanically deagglomerated/comminuted) subpigmentary mineral particulates into the starting furnishes.

It should be emphasized in the above context that none of the above-mentioned cements/adhesives or pigment-lattice-expanding media were employed, or even suggested by Fadnet.

Another viable approach for synthesizing aggregate-TiO$_2$ pigment products of the present invention parallels, to some extent, the methods for making composite pigment products of the extended-ZnS and extended-TiO$_2$ types, disclosed in the previously mentioned U.S. Pat. Nos. 2,176,875, 2,176,876 and 2,176,877 to Alessandroni, who flocculated composite pigment furnishes with extraneous agents or blended two separately prepared pigment furnishes, each of which was dispersed with an agent incompatible with the other one.

In modifying Alessandroni's approach, outlined above. TiO$_2$ furnishes dispersed with anionic, inorganic dispersants, such as alkali-metal phosphates and alkali-metal silicates, are treated with cationically active organic agents (flocculants), e.g., polyacrylamides, which react chemically with the anionic dispersants to intrinsically aggregate (flocculate) and cement the $TiO_2$ furnishes in question.

In another version of the above approach, $TiO_2$ furnishes dispersed with anionic, organic (monomeric or polymeric) dispersants are treated with organic, cationic polyelectrolytes which react with the anionic counterparts to intrinsically aggregate (flocculate) and cement the $TiO_2$ furnishes, forming in situ adhesives of a polysalt type.

In yet another version of the above approach, one portion of $TiO_2$ furnish is dispersed with an anionic dispersant, which may be organic and/or inorganic, monomeric and/or polymeric, the other portion of the furnish being treated with an organic, cationic polyelectrolyte. During the subsequent blending and homogenization of both separate furnish portions, a reaction takes place between the anionic and cationic counterparts leading to an intrinsic aggregation (flocculation) of the combined $TiO_2$ furnish. It is often advantageous to maintain an alkaline pH (well above the isoelectric point of the cationic polyelectrolyte) during the blending and homogenization of the anionic and cationic furnish portions, and to acidify the system with liquid or gaseous acids after the homogenization of the combined furnish is completed.

In all three process versions described above, the flocculated furnishes can be optionally treated with secondary flocculants and/or acidified, followed by filtration, drying and pulverization to yield aggregate-$TiO_2$ pigment products. As is readily understood by those skilled in the art, the adhesive action of the in-situ-formed organic/inorganic complexes or organic polysalts may not always be sufficient to ensure adequate integrity of the resultant $TiO_2$-particle aggregates. It is thus advisable to screen beforehand the anionic and cationic agent counterparts to be employed, for example, by reacting aqueous solutions of the individual anionic and cationic counterparts in plain water and evaluating the reaction products (which should form rapidly) for adhesivity towards polar (mineral) surfaces.

As is also readily understood, none of the three processing approaches under discussion is capable of providing a practically significant level of aggregate-$TiO_2$ pigment-lattice expansion. Any arbitrary level of such an expansion, within reasonable limits, of course, can be obtained with the aid of additional subpigmentary mineral pigment-lattice-expanding media, used along with appropriate extraneous organic cements/adhesives, as previously specified. The preferred such cements/adhesives are those which have no adhesive action in the state "as is," but develop such an action after a chemical reaction, e.g., induced (facilitated) by catalysts, acidification, heating, or radiation treatment. The preferred finishing approach, when using the above-mentioned combination of pigment-lattice expanders and cements/adhesives is a rapid spray-drying or freeze-drying of the flocculated and rinsed filtercake. The spray-dried (freeze-dried) material is pulverized and subsequently cured (treated) by chemical or physical means, or is cured (treated) first and then pulverized.

It should be pointed out in the above context that none of the processing-approach modifications, in general, or the entirely novel approaches, in particular, outlined above by the applicant, was used or proposed by either Alessandroni or Fadnet, or anyone else for that matter, to the best of the applicant's knowledge.

The approach employed by Jones et al. in WO 87/00544 for making "structured kaolin pigments" is also applicable to the synthesis of aggregate-$TiO_2$ pigment products of the present invention after appropriate modifications.

In a modified version of the above-mentioned approach, a pigmentary and/or subpigmentary $TiO_2$ raw material is made down into a well-dispersed slurry and blended intimately with subpigmentary "cement precursors" (not contemplated in WO 87/00544), employed in proportions of up to 20 parts, by weight, for each 100 parts, by weight, of $TiO_2$ and other pigmentary and subpigmentary raw materials. The cement precursors encompassing, for example, alkaline-earth metal carbonates or hydrates, and lithium carbonate, can be synthesized in situ (in the $TiO_2$ raw material slurry) or be obtained extraneously by means of deagglomeration and/or comminution of commercially available such materials and then blended with $TiO_2$ and other pigmentary and/or subpigmentary raw materials.

After the raw-material slurry is dried and pulverized, the "solid-state" furnish, containing 0.4–1.0%, by weight, of moisture, is saturated at least once with appropriate chloride compounds of silicon, aluminum or titanium, which are then hydrolyzed in situ with the aid of ammonia and converted into cements. The above metal chlorides respond to a general formula of $MCl_x$, the elements symbolized by M being selected from the group consisting of silicon, aluminum and titanium, whereas the factor symbolized by x is equal to 3 or 4. The chloride compounds in question are employed in proportions of up to 4 parts, by weight, for each 100 parts, by weight, of $TiO_2$ and other pigmentary and/or subpigmentary raw materials, while the ammonia is employed correspondingly in proportions of up to 1.6 parts, by weight, for each 100 parts, by weight, of the above-mentioned raw materials.

As is readily understood, the cement precursors in WO 87/00544 to Jones et al., i.e., conventional (commercial) lithium carbonate, alkaline-earth metal carbonates and alkaline-earth hydroxides, used in proportions of from 0.5% to 12%, by weight, of furnish mass, are too coarse by about two orders of magnitude to qualify as effective pigment-lattice-expanding media for the aggregate-$TiO_2$ pigment products of the present invention. In contrast, the analogous subpigmentary, in-situ-precipitated or mechanically deagglomerated/comminuted equivalent cement precursors, specified by the applicant, are of the type well proven as effective pigment-lattice-expanding media. As is also readily understood, applicant's approach employing a preliminary "wet" stage (aqueous slurry of pigmentary and/or subpigmentary raw materials) is ideally suited for a simultaneous incorporation of extraneous organic cements/adhesives into the resultant aggregate-$TiO_2$ pigment products under discussion.

Although the optical-performance efficacy of the aggregate-$TiO_2$ pigment products synthesized by the above-described alternative approaches (none of which is based on the crucially important instantaneous flocculation of all furnish components) is inferior in many respects to that of analogous aggregate-$TiO_2$ pigment products made by the preferred approach of the present invention based on the use of the in-situ synthesized calcium-silico-aluminate or similar complex (multicomponent) microgel cements, it is still substantially higher than the optical-performance efficacy of loose (unadulterated) TiO$_2$ pigments, or equivalent blends of TiO$_2$ with co-pigments, used in the prior art.

While certain preferred practices and embodiments of this invention have been set forth in the foregoing specification, it is understood by those skilled in the art that other variations and modifications may be employed within the scope of the teachings of the present invention. The detailed description is, therefore, not to be taken in a limiting sense and the scope of the present invention is best defined by the claims to follow.

What is claimed is:

1. Aggregate-TiO$_2$ pigment products comprising in each 100 parts, by weight, at least one particulate TiO$_2$ material in proportions of at least 50 parts, by weight, employed alone or in a combination with other pigmentary and subpigmentary raw materials, and at least one cement/adhesive in proportions of from 0.1 up to 23 parts, by weight.

2. Aggregate-TiO$_2$ pigment products in accordance with claim 1, wherein said at least one particulate TiO$_2$ material is selected from the group consisting of
   (a) TiO$_2$ pigments having essentially 100%, by weight, particles finer than 1.5 µm; 98–99%, by weight, finer than 1 µm; and 35–50%, by weight, finer than 0.3 µm, in diameter;
   (b) extra-fine pigmentary TiO$_2$ derived from TiO$_2$ pigments by a comminution to a particle size essentially 100%, by weight, finer than 0.9 µm, in diameter;
   (c) borderline pigmentary TiO$_2$ derived from TiO$_2$ pigments by a comminution to a particle size essentially 100%, by weight, finer than 0.2 µm, in diameter; and
   (d) subpigmentary TiO$_2$ derived from TiO$_2$ pigments by a comminution to a particle size essentially 100%, by weight, finer than 0.1 µm, in diameter.

3. Aggregate-TiO$_2$ pigment products in accordance with claim 1, optionally comprising in each 100 parts, by weight, at least one of the following additional materials within the indicated proportions:
   (a) in-situ-synthesized subpigmentary particulates, up to 25 parts, by weight;
   (b) extraneous, mechanically deagglomerated/comminuted subpigmentary particulates, up to 25 parts, by weight;
   (c) inorganic, low-refractive-index pigmentary diluents, up to 45 parts, by weight;
   (d) organic, low-refractive-index, non-film-forming pigmentary diluents, up to 10 parts, by weight;
   (e) color dyes, up to 5.0 parts, by weight;
   (f) carbon black, up to 0.25 parts, by weight; and
   (g) organic, cationically active chemical compounds with at least two reactive groups in each molecule, up to 0.5 parts, by weight.

4. Aggregate-TiO$_2$ pigment products in accordance with claim 3, wherein said at least one in-situ synthesized subpigmentary particulate material is selected from the group consisting of alumino-silicates, hydrated alumina, hydrated silica, calcium silicate, calcium sulfate, barium sulfate, calcium carbonate, lithium carbonate, calcium hydroxide and magnesium hydroxide.

5. Aggregate-TiO$_2$ pigment products in accordance with claim 3, wherein said at least one extraneous, mechanically deagglomerated/comminuted subpigmentary particulate material is selected from the group consisting of precipitated alumino-silicates and calcium silicates.

6. Aggregate-TiO$_2$ pigment products in accordance with claim 3, wherein said at least one inorganic low-refractive-index pigmentary diluent is selected from the group consisting of calcined clay, hydrous kaolin clays, talcum, water-ground calcium carbonate, precipitated calcium sulfate, calcium silicate, calcium carbonate, alumina, silica and alumino-silicates.

7. Aggregate-TiO$_2$ pigment products in accordance with claim 3, wherein said at least one organic low-refractive-index pigmentary diluent is selected from the group consisting of non-film-forming spherical polyacrylic and polystyrene particulates.

8. Aggregate-TiO$_2$ pigment products in accordance with claim 3, wherein said at least one color dye is selected from the group consisting of disperse dyes, water-soluble anionic dyes, and water-soluble cationic dyes.

9. Aggregate-TiO$_2$ pigment products in accordance with claim 3, wherein said carbon black is in the form of a deagglomerated masterbatch prepared with the aid of high-shear compounding with concentrated aqueous slurries of mineral pigmentary and subpigmentary particulates.

10. Aggregate-TiO$_2$ pigment products in accordance with claim 3, wherein said at least one organic, cationically active chemical compound with at least two reactive groups in each molecule is selected from the group consisting of cationic surfactants, organometallic Werner complexes, and cationic polyelectrolytes.

11. Aggregate-TiO$_2$ pigment products in accordance with claim 1, wherein said at least one cement/adhesive is an in-situ synthesized complex functional microgel cement/adhesive, to be employed in the proportions of up to 20 parts, by weight, for each 100 parts, by weight, of said TiO$_2$ employed alone or in a combination with other pigmentary and subpigmentary raw materials, wherein said microgel cement/adhesive is made of
   (a) a transient, chemically reactive subcolloidal hydrosol formed of
       (1) at least one reagent selected from the group consisting of alkali-metal silicates and quaternary ammonium silicates; and
       (2) at least one reagent selected from the group consisting of alkali-metal aluminates and alkali-metal zincates, the ratio of the reagents of (1) to the reagents of (2) being from 1:10 to 10:1, by weight;
   cross-linked by
   (b) at least one gel setting agent selected from the group consisting of bivalent and multivalent inorganic salts and, optionally, at least one organic, cationically active chemical compound with two or more reactive groups in each molecule, the ratio of said gel-setting agents to said transient, chemically reactive subcolloidal hydrosol being from 1:10 to 10:1, by weight.

12. Aggregate-TiO$_2$ pigment products in accordance with either of claims 1 or 11, wherein the said at least one cement/adhesive, other than said in-situ-synthesized complex functional microgel cement/adhesive, is selected from the group consisting of in-situ-synthesized cement/adhesives and extraneous cement adhesives and is employed in a proportion of from 0.1 to 23%, by weight, instead of said in-situ-synthesized complex functional microgel cements/adhesives.

13. Aggregate-TiO$_2$ pigment products in accordance with either of claims 1 or 11, wherein the said at least one cement/adhesive, other than said in-situ-synthesized complex functional microgel cement/adhesive, is selected from the group consisting of in-situ-synthesized cement/adhesives and extraneous cement adhesives and is employed in addition to said in-situ-synthesized complex functional microgel cements/adhesives in a combined proportion of from 0.1 to 23%, by weight.

* * * * *